US012748340B2

(12) United States Patent
Nehra et al.

(10) Patent No.: US 12,748,340 B2
(45) Date of Patent: Sep. 29, 2026

(54) OPTICAL PARAMETRIC AMPLIFICATION PROTOCOLS FOR QUANTUM NONDEMOLITION MEASUREMENT

(71) Applicants: CALIFORNIA INSTITUTE OF TECHNOLOGY, Pasadena, CA (US); THE BOARD OF TRUSTEES OF THE LELAND STANFORD JUNIOR UNIVERSITY, Stanford, CA (US); NTT RESEARCH, INC., Sunnyvale, CA (US)

(72) Inventors: Rajveer Nehra, Pasadena, CA (US); Ryotatsu Yanagimoto, Stanford, CA (US); Ryan Hamerly, Sunnyvale, CA (US); Edwin Ng, Sunnyvale, CA (US); Alireza Marandi, Pasadena, CA (US); Hideo Mabuchi, Stanford, CA (US)

(73) Assignees: CALIFORNIA INSTITUTE OF TECHNOLOGY; THE BOARD OF TRUSTEES OF THE LELAND STANFORD JUNIOR UNIVERSITY; NTT RESEARCH, INC.

( * ) Notice: Subject to any disclaimer, the term of this patent is extended or adjusted under 35 U.S.C. 154(b) by 0 days.

(21) Appl. No.: 19/108,136

(22) PCT Filed: Sep. 1, 2023

(86) PCT No.: PCT/US2023/073319

§ 371 (c)(1),
(2) Date: Feb. 28, 2025

(87) PCT Pub. No.: WO2024/050518

PCT Pub. Date: Mar. 7, 2024

(65) Prior Publication Data

US 2026/0003247 A1 Jan. 1, 2026

Related U.S. Application Data

(60) Provisional application No. 63/403,217, filed on Sep. 1, 2022.

(51) Int. Cl.
*G02F 1/39* (2006.01)
*G06N 10/70* (2022.01)

(52) U.S. Cl.
CPC ............ *G02F 1/392* (2021.01); *G06N 10/70* (2022.01)

(58) Field of Classification Search
CPC ................................................ G02F 1/39–392
See application file for complete search history.

(56) References Cited

U.S. PATENT DOCUMENTS

2005/0238070 A1 10/2005 Imeshev et al.
2007/0250280 A1 10/2007 Beausoleil et al.
(Continued)

FOREIGN PATENT DOCUMENTS

JP 2014203025 A 10/2014

OTHER PUBLICATIONS

Daniel Gottesman et al., "Encoding a qubit in an oscillator", Phys Rev A, vol. 64, No. 012310, Jun. 11, 2001. 21 pages.
(Continued)

*Primary Examiner* — Rhonda S Peace
(74) *Attorney, Agent, or Firm* — AEON Law, PLLC; Adam L.K. Philipp; Jonathan E. Olson

(57) ABSTRACT

Methods and systems are presented for using optical parametric amplifiers in various ways that enhance a native quadratic coupling strength so that a photonic component of interest can be measured or otherwise observed without demolishing the component of interest at a system output. For example such components may include a number of
(Continued)

signal Bogoliubov excitations, a pump modular quadrature, or a signal quadrature squared.

19 Claims, 11 Drawing Sheets

(56) References Cited

U.S. PATENT DOCUMENTS

| | | | | |
|---|---|---|---|---|
| 2014/0299773 | A1 | 10/2014 | Nawata et al. | |
| 2022/0149823 | A1 | 5/2022 | Redmond et al. | |
| 2024/0005196 | A1* | 1/2024 | Marandi ................ | G06N 10/20 |
| 2026/0003247 | A1* | 1/2026 | Nehra ..................... | G02F 1/392 |

OTHER PUBLICATIONS

International Search Report and Written Opinion Application No. PCT/US2023/073319 dated Feb. 7, 2024, 7 pages.

K. Miyata, et al., "Implementation of a quantum cubic gate by an adaptive non-Gaussian "measurement, Phys. Rev. A 93, 022301 (2016). 12 pages.

Kae Nemoto et al., "Nearly Deterministic Linear Optical Controlled-NOT Gate", Phys Rev Lett, vol. 93, No. 250502, Dec. 15, 2004, 4 pages.

Marc Jankowski et al., "Quasi-static optical parametric amplification" Optica, vol. 9, No. 3, Mar. 1, 2022, pp. 273-279.

Mengdi Zhao et al., "InGaP quantum nanophotonic integrated circuits with 1.5% nonlinearity-to-loss ratio" Optica, vol. 9, No. 2, Feb. 18, 2022, pp. 258-263.

N. Budinger et al., All optical quantum computing using cubic phase gates, arXiv:2211.09060 (2022). 25 pages.

N. Imoto et al., "Quantum nondemolition measurement of the photon number via the optical Kerr effect" The American Physical Society , vol. 32, No. 4, Oct. 1985, pp. 2287-2292.

R. Yanagimoto et al., "Engineering a Kerr-Based Deterministic Cubic Phase Gate via Gaussian Operations", Phys. Rev. Lett. 124, 240503 (2020). 10 pages.

Ryotatsu Yanagimoto et al., "Engineering cubic quantum nondemolition Hamiltonian with mesoscopic optical parametric interactions" 9 Pages.

Ryotatsu Yanagimoto et al., "Quantum Nondemolition Measurements with Optical Parametric Amplifiers for Ultrafast Universal Quantum Information Processing", PRX Quantum, vol. 4, Mar. 29, 2023. 15 Pages.

Ryotatsu Yanagimoto et al., "Temporal trapping: a route to strong coupling and deterministic optical quantum computation" Optica, vol. 9, No. 11, Nov. 17, 2022, pp. 1289-1296.

T. Kashiwazaki et al., "Over-8-db squeezed light generation by a broadband waveguide optical parametric amplifier toward fault-tolerant ultra-fast quantum computers", arXiv preprint arXiv:2301.12658 (2023). 7 pages.

V. Kala et al., Cubic nonlinear squeezing and its decoherence, Opt. Express 30, 31456 (2022). 16 pages.

Y. Shaked et al., "Lifting the bandwidth limit of optical homodyne measurement with broadband parametric amplification", Nature Communications 9, 609, 12 pages.

Zhang et al. Zeptonewton force sensing with squeezed quadratic optomechanics, Feb. 17, 2022. [retrieved on Dec. 12, 2023). Retrieved from the Internet. entire document.

Notice of Reasons for Refusal received in the Japanese Application No. 2025-513307, dated Nov. 18, 202, 11 Pages including English translation.

* cited by examiner

OPTICAL PARAMETRIC AMPLIFICATION PROTOCOLS FOR QUANTUM NONDEMOLITION MEASUREMENT

RELATED APPLICATIONS

1. This application is a National Entry of PCT International Patent Application No. PCT/US2023/073319, filed Sep. 1, 2023, which claims priority to U.S. Provisional Application No. 63/403,217 filed Sep. 1, 2022, with title "Quantum Nondemolition Measurements With Optical Parametric Amplifiers For Ultrafast Fault-Tolerant Universal Quantum Information Processing". This invention was made with government support under Grant No(s). CCF1918549 & ECCS1846273 & PHY2011363 awarded by the National Science Foundation and under Grant No. FA9550-20-1-0040 awarded by the Air Force and under Grant No. 80NMO0018D0004 awarded by NASA. The government has certain rights in the invention.

DETAILED DESCRIPTION

Figure 1:
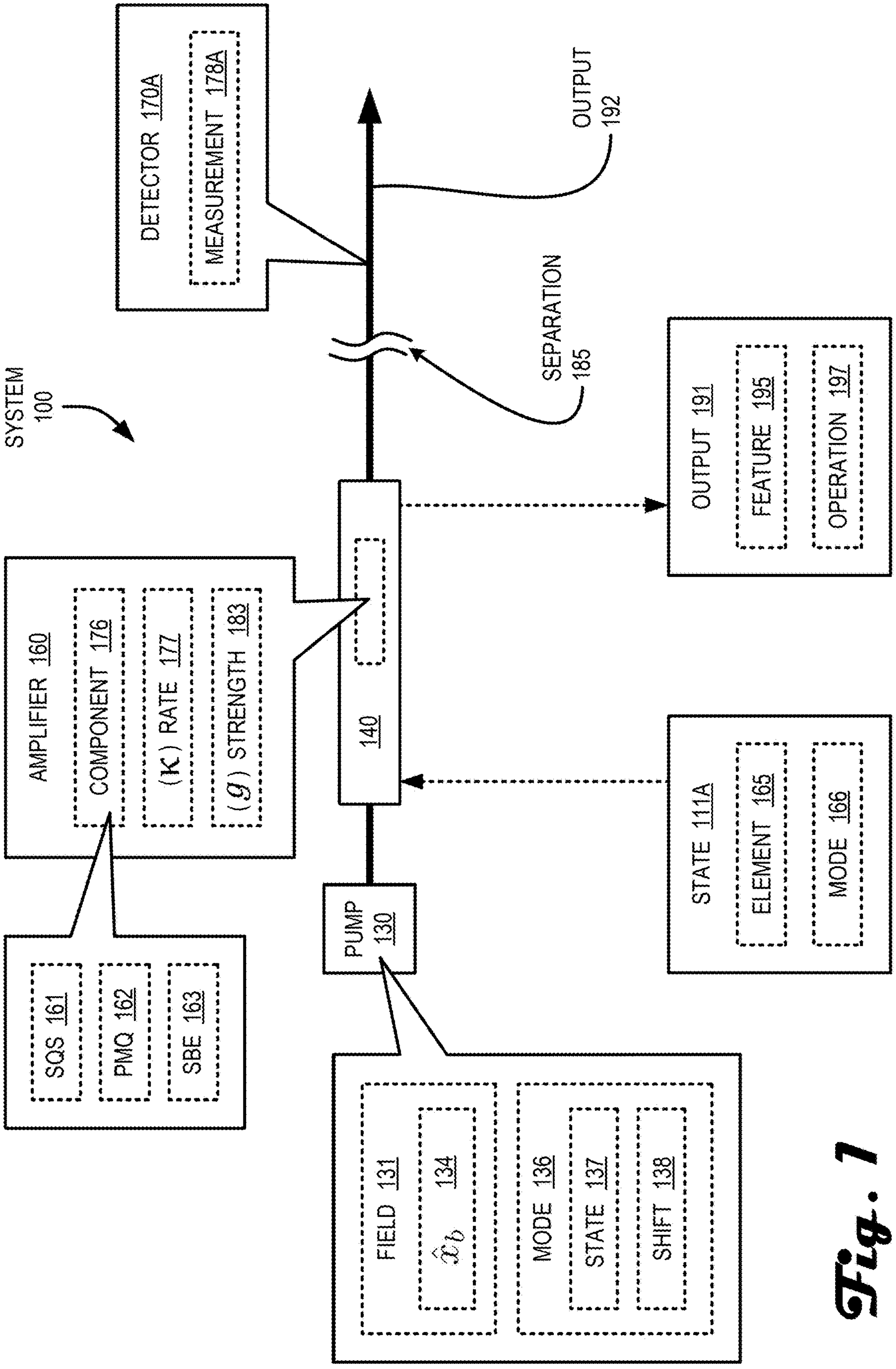
FIG. 1 schematically depicts a system in which a first encoding unit includes one or more optical parametric amplifiers (OPAs) configured for nonlinearity enhancement of at least one photonic component in which one or more improved technologies may be incorporated.

This invention was made with government support under Grant No(s). CCF1918549 & ECCS1846273 & PHY2011363 awarded by the National Science Foundation, Grant No. FA9550-20-1-0040 awarded by the Air Force, and Grant No. 80NMO0018D0004 awarded by NASA. The government has certain rights in the invention. See R. Yanagimoto, R. Nehra, R. Hamerly, E. Ng, A. Marandi, and H. Mabuchi, Quantum Nondemolition Measurements with Optical Parametric Amplifiers for Ultrafast Universal Quantum Information Processing, PRX Quantum 4, 010333 (2023) (hereinafter "the PRX article") and R. Yanagimoto, R. Nehra, R. Hamerly, E. Ng, A. Marandi, and H. Mabuchi, Engineering Cubic Quantum Nondemolition Hamiltonian with Mesoscopic Optical Parametric Interactions, Quantum Physics (quant-ph), arXiv: 2305.03260 [quant-ph], https://doi.org/10.48550/arXiv.2305.03260 (2023) (hereinafter "the Qph article").

The detailed description that follows is represented largely in terms of processes and symbolic representations of operations by conventional computer components, including a processor, memory storage devices for the processor, connected display devices, and input devices. Furthermore, some of these processes and operations may utilize conventional computer components in a heterogeneous distributed computing environment, including remote file servers, computer servers, and memory storage devices.

It is intended that the terminology used in the description presented below be interpreted in its broadest reasonable manner, even though it is being used in conjunction with a detailed description of certain example embodiments. Although certain terms may be emphasized below, any terminology intended to be interpreted in any restricted manner will be overtly and specifically defined as such.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise.

"Above," "additional," "allowed," "among," "between," "cat state," "computing," "coupling," "demolished," "effectively," "encoding," "enhanced," "established," "first," "Gaussian," "general dyne," "generated," "GKP," "Hamiltonian," "homodyne," "implemented," "including," "indirectly," "input," "intact," "intra-cavity," "larger," "measured," "mismatched," "more," "native," "nonlinear," "non-negative," "of," "optical," "other," "parametric," "photonic," "ponderomotive," "quadratic," "quantum," "said," "so as," "squeezed," "ultra-fast," "universal," "wherein," "wide," "without," or other such descriptors herein are used in their normal yes-or-no sense, not merely as terms of degree, unless context dictates otherwise. In light of the present disclosure, those skilled in the art will understand from context what is meant by "remote" and by other such positional descriptors used herein. Likewise, they will understand what is meant by "partly based" or other such descriptions of dependent computational variables/signals. "Numerous" as used herein refers to more than two dozen. "Immediate" as used herein refers to having a duration of less than 2 seconds unless context dictates otherwise. Circuitry is "invoked" as used herein if it is called on to undergo voltage state transitions so that digital signals are transmitted therefrom or therethrough unless context dictates otherwise. Software is "invoked" as used herein if it is executed/triggered unless context dictates otherwise. One number is "on the order" of another if they differ by less than an order of magnitude (i.e., by less than a factor of ten) unless context dictates otherwise. As used herein "causing" is not limited to a proximate cause but also enabling, conjoining, or other actual causes of an event or phenomenon. "Instances" of an item may or may not be identical or similar to each other, as used herein.

Terms like "processor," "center," "unit," "computer," or other such descriptors herein are used in their normal sense, in reference to an inanimate structure. Such terms do not include any people, irrespective of their location or employment or other association with the thing described, unless context dictates otherwise. "For" is not used to articulate a mere intended purpose in phrases like "circuitry for" or "instruction for," moreover, but is used normally, in descriptively identifying special purpose software or structures. "Specific," "given," and "particular" are not intended to provide any nuanced substantive description pertaining to a speciation or a gift or particles. Rather, these adjectives individuate an item or material for clear distinction from similar or other items or materials in a given context without invoking ordinal terms like "first."

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

Referring now to FIG. 1, there is shown a schematically depicted system 100 in which a first encoding unit 140 includes one or more optical parametric amplifiers (OPAs) 160. Each OPA 160 includes one or more photonic components 176 (e.g. a signal quadrature squared 161, a pump modular quadrature 162, or a number of signal Bogoliubov excitations 163) and exhibits a first decoherence rate (K) 177 and nonlinear coupling strength (g) 183. A "native" nonlinear coupling strength (g) 183 of a nonlinearity enhancement coupling can be significantly enhanced (e.g. by more than 100%) by various configurations described herein, depending upon which configuration of OPA(s) 160 and photonic component(s) 176 are used. With such a significant enhancement, in many such configurations it is possible leave a primary photonic component(s) 176 intact on one output port while obtaining a measurement 178 or other useful result via another output port.

In some contexts, for example, a photonic component 176 may be provided to encoding unit 140 as a pump field quadrature ($\hat{x}_b$) 134, mode 136, state 137, or shift 138 characteristic of a field 131 of an external pump 130. This may allow one or more features 195 of a given input component 176 (e.g. indicative of a pump modular quadrature 162) to be monitored as signal output 191 (e.g. via one or more operations 197 in lieu of a detector 170A) so that the given input component 176 continues in pump output 192 even over great distances (e.g. separations greater than 100 kilometers) rather than being demolished during measurement.

In some contexts, a photonic component 176 may be provided to encoding unit 140 as an element 165 or mode 166 of an input signal state 111A. This may allow a number of signal Bogoliubov excitations (SBE's) 163 or other input component 176 to be monitored via pump output 192 so that the corresponding input component 176 continues in a fiberoptic-born signal output 191 rather than being demolished.

Figure 2:
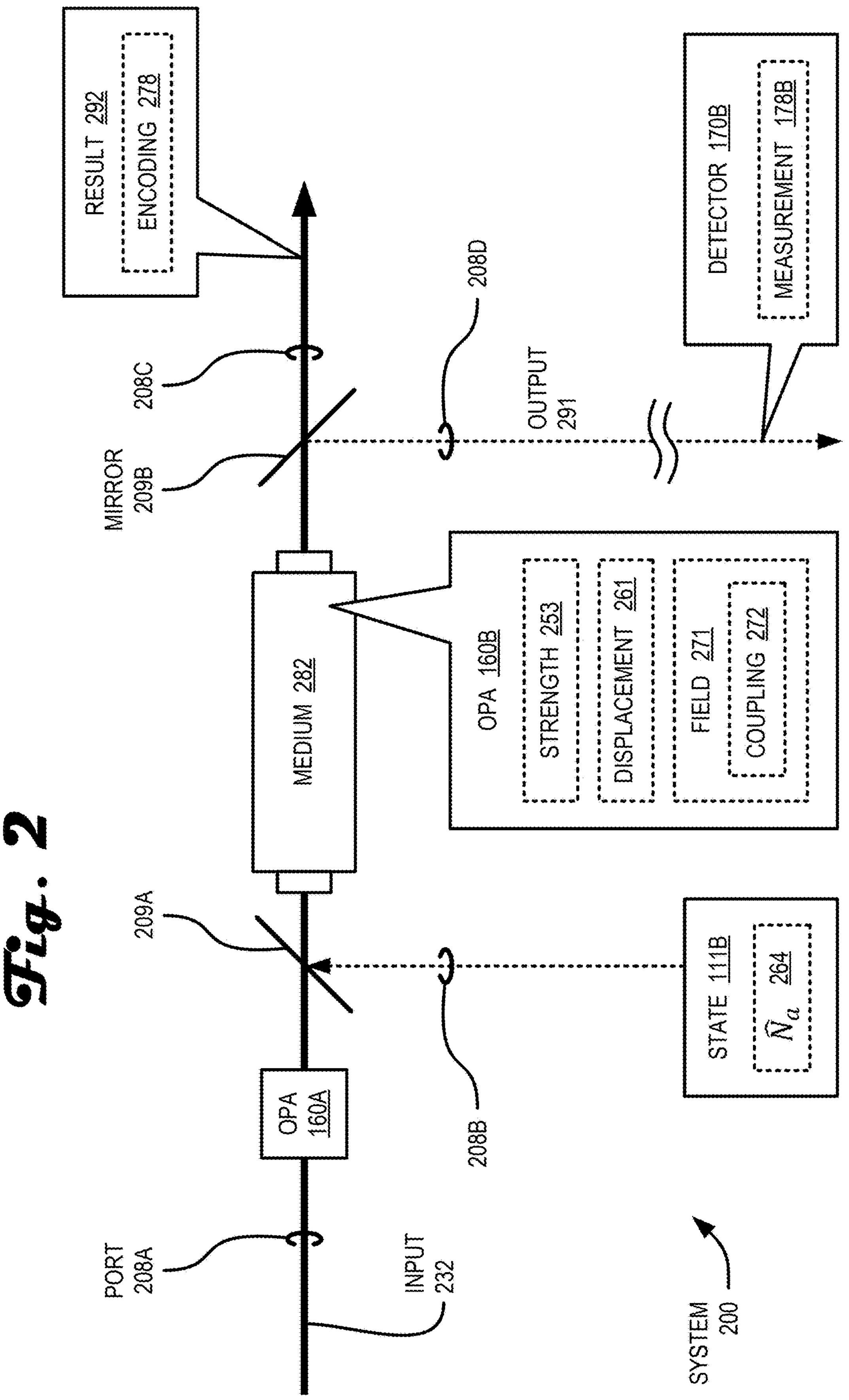
FIG. 2 likewise depicts a system suitable for nonlinearity enhancement in which one or more improved technologies may be incorporated.

Referring now to FIG. 2, there is shown a schematically depicted system 200 (e.g. as an instance of system 100) in which an external optical input 232 may arrive via port 208A and a weakly nonlinear OPA 160A and then merge via a dichroic mirror 209A with an input signal state 111B (e.g. a number 264 of SBEs) received via port 208B. The entangled input then arrive into a medium 282 having a built in optical parametric amplifier 160B characterized by an additional strength 253, displacement 261, field 271, and coupling 272 as further described below. As shown a second dichroic mirror 209B then separates a pump output 192 that exits via port 208C from a signal output 291 that exits via port 208D.

In some variants of system 200 a first specific photonic component 176 comprises a signal quadrature squared 161 that passes through a corresponding phase-matched (instance of an) OPA 160B that has a first quadratic coupling strength 183 that is enhanced with a larger additional quadratic coupling strength 253. In lieu of detector 170B, this allows such a primary photonic component 176 to pass intact via output port 208D while obtaining a measurement 178A or other accessible encoding 278 via another output port 208C. See FIGS. 9-10 with accompanying description below for variants in which (at least) a primary photonic component 176 of a fundamental harmonic passes through intact via a signal output 291, 991, 1091.

In some variants of system 200 another photonic component 176 comprises a pump modular quadrature 162 that passes through a corresponding phase-mismatched (instance of an) OPA 160B that has a first quadratic coupling strength 183 that is consequently enhanced with a larger additional quadratic coupling strength 253. In lieu of a pump output detector 170A, this allows such a primary photonic component 176 to pass intact via output port 208C while obtaining a measurement 178B or other accessible encoding via another output port 208D. See FIG. 6 with accompanying description below for variants in which a primary photonic component 176 of a pump input or similar external input 232 passes through the system 100, 200 intact as (a component of) a pump output 192 or similar result 292 via a feedforward operator.

Likewise in some variants of one or more systems 100, 200 a first particular photonic component 176 comprises a number 264 of signal Bogoliubov excitations 163 that pass through a corresponding phase-mismatched (instance of an) OPA 160B that has a first quadratic coupling strength 183 that is enhanced with a larger additional quadratic coupling strength 253. In lieu of detector 170B, this allows such a primary photonic component 176 to pass intact via output port 208D while obtaining a state-indicative inference/measurement 178A or other accessible encoding 278 via another output port 208C. Suitably large additional quadratic coupling strengths 253 as described herein can preserve a primary photonic component 176 [of a fundamental harmonic] that passes through via a signal output 191, 291, 391. See FIG. 3.

Figure 3:
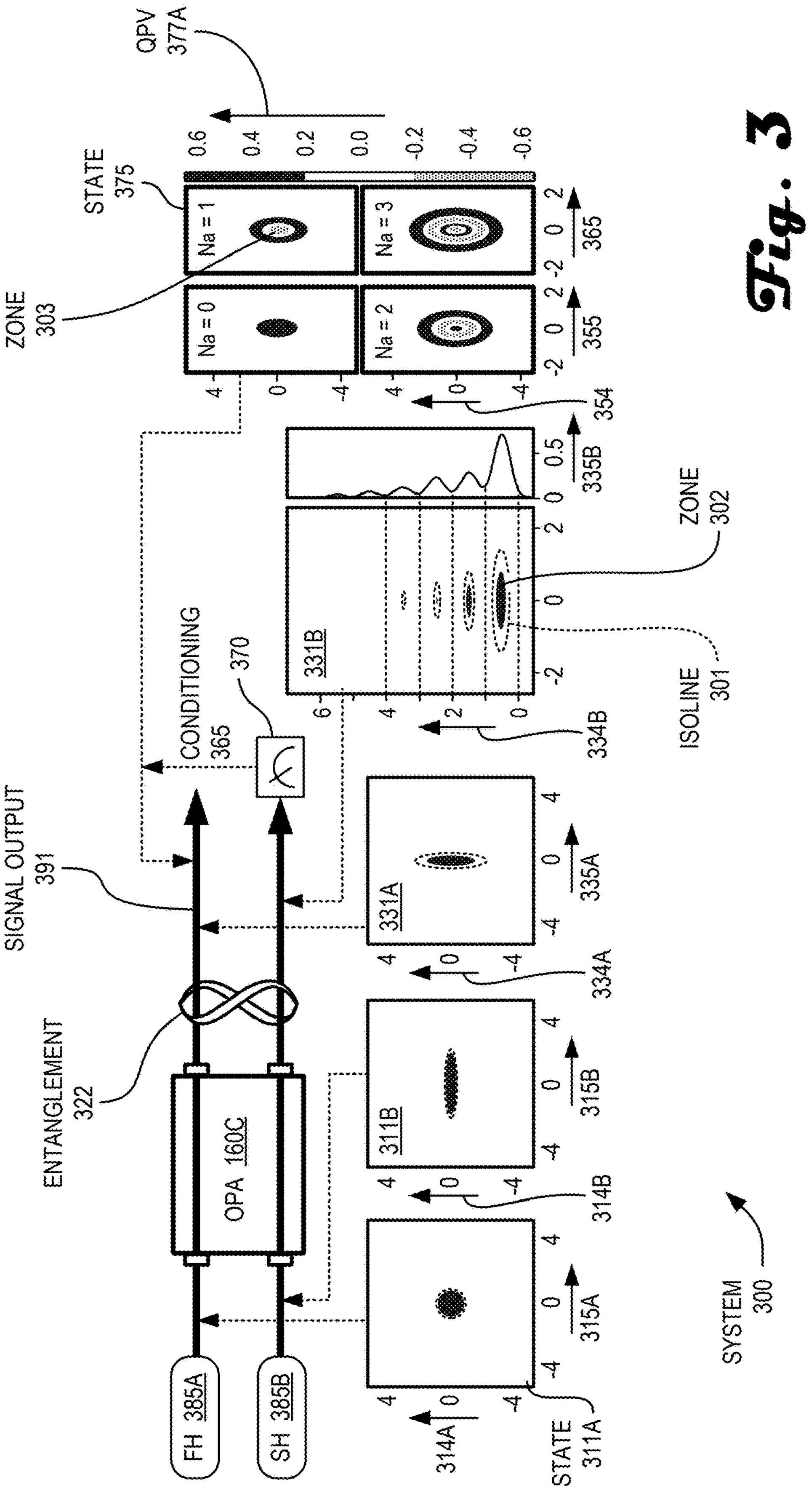
FIG. 3 depicts a system featuring at least one phase-mismatched OPA for nonlinearity enhancement in which one or more improved technologies may be incorporated.

Referring now to FIG. 3, there is shown a schematically depicted system 300 that can, in some variants, include or resemble system 100 or system 200 (or both). A phase-mismatched optical parametric amplifier 160C as shown receives a fundamental harmonic mode 385A (e.g. a number 264 of SBEs 163) corresponding to state 311A and a second harmonic mode 385B corresponding to state 311B whereby the harmonics 385A-B undergo an entanglement 322 and a selective nonlinear coupling strength enhancement.

With Reference to the Prx Article

FIG. 1 of the PRX article corresponds with FIG. 3 herein, adapted for compliance with PCT drafting standards. FIG. 3 herein presents our PNR QND measurement scheme using nonlinear quantum behavior of an OPA, where the phase-space representation (i.e., Wigner functions) of the system state at each step of the protocol is shown using numerical data. For the numerical simulation, we consider an initial coherent signal state $|\varphi_a(0)\rangle = |a=0.7\rangle$ shown in state 311A plotting a sine component axis 314A ($p_a$ quadrature) against a cosine component axis 315A ($x_a$ quadrature). A nominally circular zone 302 (shown in solid black) signals a quasi-probability value 377A of about 0.2 or higher. A dashed isoline 301 signals a smaller positive quasi-probability value 377A for this state 311A. We assume a p-squeezed vacuum state 311B with width w=¼ as an initial pump state 311B plotting axis 314B ($p_b$) against axis 315B ($x_b$).

[Para 0029]. The signal and pump states interact through a frequency-detuned OPA 160C whose dynamics induce conditional p displacements of the pump field depending on the number 264 of signal Bogoliubov excitations 163. Concurrently, the OPA dynamics also cause conditional rotations on the signal Bogoliubov excitation 163 depending on $x_b$, leading to the phase spread of the final unconditional signal state 331A characterizing the signal output 391 plotting axis 334B ($p_a$) against axis 335B ($x_a$). We note that for each state 375 of $N_a$ equal to 1 to 3 that some zones 303 have an elliptical or annular portion signaling a quasi-probability value 377A of about −0.2 or lower.

A complete p-homodyne measurement 370 on the final pump state 331B acts as a QND measurement of $\tilde{N}_a$ and projects the signal mode on a squeezed photon-number state, which is an eigenstate of $\hat{N}_a$. The final pump state 331B shown with the p-quadrature distribution $P(p_b)$. Ensemble-averaged signal states 375 conditioned on the outcome of the homodyne measurement within an interval [18] gt(Na−1)≤ˆ$p_b$≤˜gt(Na+1). We use the system parameters of Δ/g=150 and ˜g/g=1, and the total interaction time of gt=1.

Realization of a room-temperature ultra-fast photon-number-resolving (PNR) quantum nondemolition (QND) measurement will have significant implications for photonic quantum information processing (QIP), enabling, e.g., deterministic quantum computation in discrete-variable architectures, but the difficulty in implementing sufficiently strong coupling has hampered the development of scalable implementations. The PRX article proposed and analyzed a nonlinear-optical route to PNR QND using quadratic (i.e., $\chi^{(2)}$) nonlinear interactions. We show that the coherent pump field 131 driving a phase-mismatched (i.e. frequency-detuned) OPA 160C experiences displacements 261 beneficially conditioned on the number 264 of signal Bogoliubov excitations 163. A measurement of the pump displacement thus provides a QND measurement 178A of the signal Bogoliubov excitations 163, projecting the signal mode to a squeezed photon-number state. We then show how our nonlinear OPA dynamics can be utilized for deterministically generating Gottesman-Kitaev-Preskill states via one or more additional Gaussian resources, offering an all-optical route for fault-tolerant QIP in continuous-variable systems. Finally, we place these QND schemes into a more traditional context by highlighting analogies between the phase-mismatched optical parametric oscillator and multilevel atom-cavity QED systems, by showing how continuous monitoring of the outcoupled pump quadrature induces conditional localization of the intracavity signal mode onto squeezed photon-number states. Our analysis suggests that our proposal may be viable in near-term $\chi^{(2)}$ nonlinear nanophotonics, highlighting the rich potential of OPAs 160 as a universal tool for ultrafast non-Gaussian quantum state engineering and quantum computation.

Quantum information science and engineering offer great potential for revolutionizing many fields such as computation, communication, and metrology. Among various physical systems that have been experimented with to encode and process quantum information, photonics offers significant advantages in room-temperature scalability and ultra-fast operations. Optical photons can span terahertz bandwidths and propagate over long distances with little decoherence, making them an ideal carrier of quantum information. In photonic quantum computation, information can be encoded and processed in both discrete-variable (DV) and continuous-variable (CV) architectures. However, the lack of strong optical nonlinearity has hindered the realization of deterministic two-qubit entangling gates in DV architectures, and non-Gaussian resources such as Gottesman-Kitaev-Preskill (GKP) states in CV architectures; both of these are essential for building universal fault-tolerant quantum information processors. While some limitations of weak optical nonlinearity can be circumvented through measurement-based nonlinear operations using photon-number-resolving (PNR) measurement, the intrinsically probabilistic nature of these operations and the slow speed of the conventional single-photon detectors (e.g., superconducting nanowires and superconducting transition-edge sensors) with complex cryogenic systems severely limit the scalability and computation clock rates in these architectures.

In this context, a realization of ultrafast, room-temperature PNR QND measurement has significant implications in both DV and CV systems. In a PNR QND measurement, information about the number of photons is encoded in an auxiliary probe, and backaction is limited to (partial) projection onto a corresponding photon-number eigenstate. Such an ultrafast QND measurement not only can replace the conventional superconducting PNR detectors, but also can directly realize a deterministic two-qubit entangling gate, which enables deterministic DV optical quantum computation. Additionally, the QND nature of the measurement offers unique opportunities for quantum engineering, communication, and metrology. To realize a PNR QND measurement with a resolvable single-photon energy shift it is helpful to have a coupling strong enough so that $$\frac{g}{\kappa} > 1$$

(for coherent coupling gate g and decoherence rate κ). Since the pioneering works in atom-cavity quantum electrodynamics (QED), strong coupling has been demonstrated in various physical systems. However, concomitant implementations of the QND measurement in a scalable, high-bandwidth, and room-temperature platform have yet to be developed.

In the PRX article, a nonlinear-optical route to PNR QND measurements and all-optical quantum state engineering for GKP states was proposed and analyzed using a quadratic optical parametric amplifier (OPA) 160. Compared to the existing PNR QND measurement proposals and GKP-state generation schemes using cubic nonlinearities, our proposal with OPA 160 utilizes much stronger quadratic nonlinearity, offering a more experimentally viable route. Recently, $$\frac{g}{\kappa} \sim 0.01$$

has been demonstrated with a quadratic nonlinear nanophotonic resonator, and even $$\frac{g}{\kappa} \sim 10$$

may be envisioned with ultrafast pulses.

In the following, we first show that the pump field 131 of a phase-mismatched OPA 160 experiences conditional displacements 261 depending on a number ($\tilde{N}_a$) 264 of signal Bogoliubov excitations 163, while $N_a$ is substantially preserved under the OPA dynamics. As a result, measuring the pump displacement allows one to perform a PNR QND measurement of $N_a$. Next, we show that the nonlinear OPA dynamics can be utilized to perform a modulo quadrature QND measurement of the pump mode, with which we show a near-deterministic generation of the GKP states in the pump mode with only additional Gaussian resources, showing a nonlinear-optical route to universal fault-tolerant CVQIP. Finally, we bridge the physics of these QND schemes to a more traditional context by establishing analogies between a phase-mismatched optical parametric oscillator (OPO) and multilevel atom-cavity QED systems. We observe conditional localization of the intracavity state to the squeezed Fock state ladder, which in experiments can be inferred from the pump homodyne record without monitoring the signal photon loss at all, using a quantum filter.

Pnr Qnd Measurements with Phase-Mismatched Opa

We consider a phase-mismatched single-mode quadratic nonlinear Hamiltonian $$\hat{H} = g\left(\hat{a}^{\dagger 2}\hat{b} + \hat{a}^2\hat{b}^\dagger\right) + \delta\hat{a}^\dagger\hat{a}, \tag{1}$$

where â and $\hat{b}$ represent annihilation operators for the signal (i.e., fundamental harmonic) and the pump (i.e., second harmonic) modes, respectively, and g>0 is the nonlinear coupling strength 183. See "Temporal trapping: a route to strong coupling and deterministic optical quantum computation" by Ryotatsu Yanagimoto et al. in Optica Vol. 9, No. 11 (November 2022) (hereinafter "the Optica article"). All of the articles mentioned herein provide helpful context, moreover, and should ideally be considered for helpful context that buttresses the present disclosure.

We assume a non-negative phase mismatch between signal and pump 130 δ≥0 without loss of generality. It is worth noting that various photonic systems can be described by Eq. (1), including high-Q microring resonators, photonic-crystal cavities, temporally trapped ultrashort pulses, and superconducting microwave circuits, and our results herein are consistent with any of these variants.

To treat the pump coherent amplitude (which may be large in many practical scenarios) in a parametrized way, we transform to a displaced frame given by a unitary $\hat{D}_b(\beta)=\exp(\beta\hat{b}^\dagger-\beta^*\hat{b})$, where the mean field of the pump mode is "factored out" as $$|\psi(t)\rangle = \hat{D}_b(\beta)|\varphi(t)\rangle, \tag{2}$$

where |Ψ(t)⟩ and |φ(t)⟩ are the system states in the lab frame and the displaced frame, respectively. We assume β is real and positive without loss of generality. Physically, |φ(t)⟩ accounts for quantum fluctuations around the mean field, whose dynamics follow $$i\partial_t|\varphi(t)\rangle = \hat{H}_D|\varphi(t)\rangle, \tag{3}$$

where the Hamiltonian $$\hat{H}_D = \hat{D}_b^\dagger(\beta)\hat{H}\hat{D}_b(\beta) = \hat{H}_{NL} + \hat{H}_Q \tag{4}$$

is composed of a cubic nonlinear term and a quadratic term $$\hat{H}_{NL} = g\left(\hat{a}^{\dagger 2}\hat{b} + \hat{a}^2\hat{b}^\dagger\right),\ \hat{H}_Q = \delta\hat{a}^\dagger\hat{a} + \frac{r}{2}\left(\hat{a}^{\dagger 2} + \hat{a}^2\right), \tag{5}$$

with r=2gβ. From here on, we assume we are in the displaced frame unless specified. An OPA 160 is realized for an initial state $$|\varphi(0)\rangle = |\varphi_a(0)\rangle|\varphi_b(0)\rangle \text{ with } |\varphi_b(0)\rangle = |0\rangle, \tag{6}$$

whose pump state is a coherent state with displacement β in the laboratory frame. A conventional approach to analyze an OPA is to use an undepleted pump approximation, where the pump state remains invariant throughout the dynamics. This approximation is equivalent to ignoring $\hat{H}_{NL}$ in $\hat{H}_D$, leading to single-mode squeezing of the signal state, which is the expected behavior of an OPA in the regime of Gaussian quantum optics. See R. Yanagimoto, E. Ng, A. Yamamura, T. Onodera, L. G. Wright, M. Jankowski, M. M. Fejer, P. L. McMahon, and H. Mabuchi, Onset of Non-Gaussian Quantum Physics in Pulsed Squeezing with Mesoscopic Fields, Optica 9, 379 (2022).

Under stronger nonlinearity where the undepleted pump approximation breaks down, the contribution of the nonlinear term $\hat{H}_{NL}$ induces non-Gaussian quantum features 195, e.g., signal-pump entanglement, for which we critically lack a qualitative physical description. In the following we show a concise description of the nonlinear quantum behavior of phase-mismatched OPAs 160 as a significant facilitator of QND measurement 178 of signal photons in the squeezed photon-number basis. Our analysis adopts the Hamiltonian transformation recently introduced in W. Qin, A. Miranowicz, and F. Nori, Beating the 3 dB Limit for Intracavity Squeezing and Its Application to Nondemolition Qubit Readout, Phys. Rev. Lett. 129, 123602 (2022).

Assuming a relatively large phase-mismatch δ>r, we can rewrite $\hat{H}_Q$ as $$\hat{H}_Q = \delta\hat{a}^\dagger\hat{a} + \frac{r}{2}\left(\hat{a}^{\dagger 2} + \hat{a}^2\right) = \Delta\hat{A}^\dagger\hat{A} + const, \tag{7}$$

where $\hat{A}=\hat{a}\cosh u+\hat{a}^\dagger\sinh u$ corresponds to the annihilation operator for Bogoliubov excitations 163 with $\Delta=\sqrt{\delta^2-r^2}$ and $$u = \tanh^{-1}\left(\frac{r}{\delta}\right)/2.$$

Intuitively, we can interpret $\hat{A}$ as an annihilation operator of a photon excitation in a squeezed photon-number basis. The nonlinear Hamiltonian can then be rewritten in terms of the Bogoliubov operators as $$\hat{H}_{NL} = g\left\{\cosh^2 u\hat{A}^{\dagger 2} + \sinh^2 u\hat{A}^2 - \sinh 2u\left(\hat{A}^\dagger\hat{A} + \frac{1}{2}\right)\right\}\hat{b} + H.c. \tag{8}$$

For the rest of the work, we assume that the magnitude of $\hat{H}_Q$" dominates over $\hat{H}_{NL}$, i.e., $ge^{2u} << \Delta$, which can always be achieved by appropriately choosing δ and r (i.e., β). Under these conditions, the contributions from the rapidly rotating terms containing $\hat{A}^2$ and $\hat{A}^{\dagger 2}$ average out, allowing us to perform a rotating-wave approximation. We thus have $$\hat{H}_D \approx -2\tilde{g}\left(\hat{N}_a + \frac{1}{2}\right)\hat{x}_b + \Delta\hat{N}_a + const, \tag{9}$$

In the Heisenberg picture, we analytically solve the operator dynamics under the above equation as $$\hat{N}_a(t) \approx \hat{N}_a(0),\ \hat{p}_b(t) \approx \tilde{g}t\left(\hat{N}_a(0) + \frac{1}{2}\right) + \hat{p}_b(0), \tag{10}$$

where $\hat{p}_b = (\hat{b} - \hat{b}^\dagger)/2i$ is the p-quadrature operator of the pump mode. From Eq. (10), we note that the pump mode $\hat{p}_b$ experiences a displacement conditioned on the value of $\hat{N}_a$, leading to a specific signal-pump entanglement structure. Additionally, $[\hat{H}_D, \hat{N}_a] \approx 0$ ensures that the value of $\hat{N}_a$ is not disturbed during the system evolution. As a result, homodyne measurement of $\hat{p}_b$ allows us to infer $\hat{N}_a$ without performing a destructive measurement on the signal mode, thereby realizing a QND measurement of $\hat{N}_a$. Depending on the measurement result of $\hat{p}_b$, the signal state is projected onto an eigenstate of $\hat{N}_a$ with eigenvalue $N_a$, i.e., a squeezed photon-number state $$|N_a\rangle = 1/\left(\sqrt{N_a!}\right)\hat{A}^{\dagger N_a}|0\rangle. \tag{11}$$

This situation is summarized in FIG. 3 herein.

The performance of our PNR QND measurement depends on the measurement accuracy of $\hat{p}_b$, which is limited by the quadrature fluctuations of the probe pump state. Intuitively, the conditional displacement $d = \tilde{g}t$ seems to be sufficiently large compared to the width of the p-quadrature fluctuations $$w = \sqrt{\langle\varphi_b|\hat{p}_b^2|\varphi_b\rangle - \langle\varphi_b|\hat{p}_b|\varphi_b\rangle^2}$$

to infer the value of $\hat{N}_a$ with high confidence. In FIG. 3 herein, we show the result of a full-quantum simulation of nonlinear OPA dynamics with an initial squeezed-vacuum pump state with $$w = \frac{1}{4}.$$

The final pump state exhibits multiple Gaussian peaks in the phase-space separated by the distance d, each of which corresponds to a different number $\hat{N}_a$. of signal Bogoliubov excitations 163. Because we have $$\frac{d}{w} = 4\left(d = 1,\ w = \frac{1}{4}\right)$$

for the parameters used for this figure, conditioning on the measurement result of $\hat{p}_b$ projects the signal state to a squeezed photon-number state with fidelity that can exceed 90% with the assumed system parameters.

Figure 4:
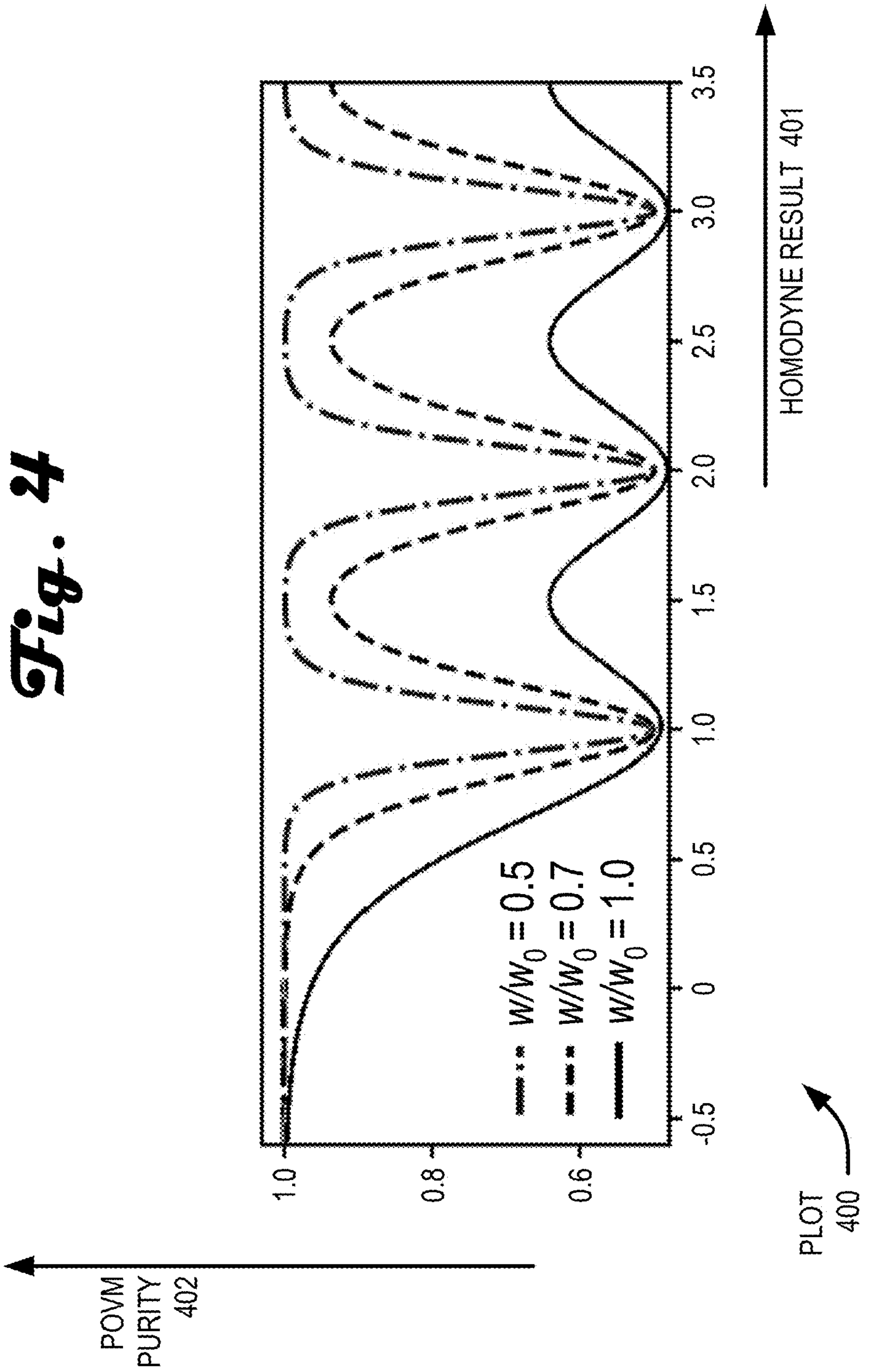
FIG. 4 plots a positive-operator-valued measure (POVM) purity as a function of a pump homodyne result for a quantum nondemolition (QND) measurement protocol in which one or more improved technologies may be incorporated.

Referring now to FIG. 4, there is shown a plot 400 of POVM purity for our QND measurement protocol as a function of the pump homodyne result 401 ($p_b/d$). See R. Nehra, M. Eaton, C. González-Arciniegas, M. Kim, and O. Pfister, Loss tolerant quantum state tomography by number-resolving measurements without approximate displacements, arXiv: 1911.00173 [quant-ph] (2019). We consider a Gaussian probe pump state $|\varphi_b(0)\rangle$ with various width w, where w below the vacuum level $w_0 = ½$ indicates that $|\varphi_b(0)\rangle$ is a squeezed vacuum.

To establish more quantitative connections between the performance of the measurement and the squeezing of the probe-pump quadrature fluctuations, we provide the expressions for the Kraus operators of our QND measurement protocol. From Eq. (9), the Kraus operators can be expressed as $$\hat{M}(p_b) = \sum_{N_a=0}^{\infty} C_{N_a}(p_b)|N_a\rangle\langle N_a|, \tag{12}$$

with $$C_{N_a}(p_b) = e^{-i\Delta N_a t}\left\langle p_b - d\left(N_a + \frac{1}{2}\right)\middle|\varphi_b\right\rangle$$

being the complex probability amplitudes for the measurement outcomes, where $|p_b\rangle$ is an eigenstate of $\hat{p}_b$, with an eigenvalue $p_b$ (see Appendix B of the PRX article for full derivations). The Kraus operators are related to a positive operator-valued measure (POVM) with elements $$\hat{F}(p_b) = \hat{M}^\dagger(p_b)\hat{M}(p_b) = \sum_{N_a=0}^{\infty}|C_{N_a}(p_b)|^2|N_a\rangle\langle N_a|. \tag{13}$$

Physically, the outcome of a complete pump homodyne measurement $p_b$ follows a probability distribution $P(p_b) = \langle\varphi_a|\hat{F}(p_b)|\varphi_a\rangle$, and conditioned on the outcome $p_b$, the post-measurement signal state becomes $$|\varphi_a'(p_b)\rangle = \hat{M}(p_b)|\varphi_a(0)\rangle \tag{14}$$

up to normalization.

It is worth mentioning that the POVM is not completely selective with respect to Na, because ^F ($p_b$) is not solely composed of a single squeezed-Fock-state projector $|N_a\rangle\langle N_a|$. To characterize the mixedness of the POVM, it is insightful to consider its relative weights on the squeezed-Fock-state projectors $$W_{N_a}(p_b) = \frac{|C_{N_a}(p_b)|^2}{\sum_{N_a'=0}^{\infty} |C_{N_a'}(p_b)|^2}, \tag{15}$$

which can be intuitively interpreted as the weights applied to $|N_a\rangle$ conditioned on the homodyne outcome (see Appendix B below for full discussions). In particular, $W_{Na}(p_b)=1$ implies the post measurement state conditioned on the homodyne outcome $p_b$ is a pure squeezed Fock state $|Na\rangle$.

In FIG. 4, we show the purity of the POVM as a function of the homodyne measurement outcome $p_b$, where we assume squeezed vacuum states with width w as the initial pump state. As can be seen from the figure, use of a pump probe state with smaller w improves the purity of the POVM for a given d, projecting the signal to a squeezed photon-number state with a higher fidelity. From an experimental perspective, squeezing the pump quadrature allows us to implement a PNR QND measurement with a shorter non-linear interaction time, and hence potentially lower propagation loss.

Figure 5:
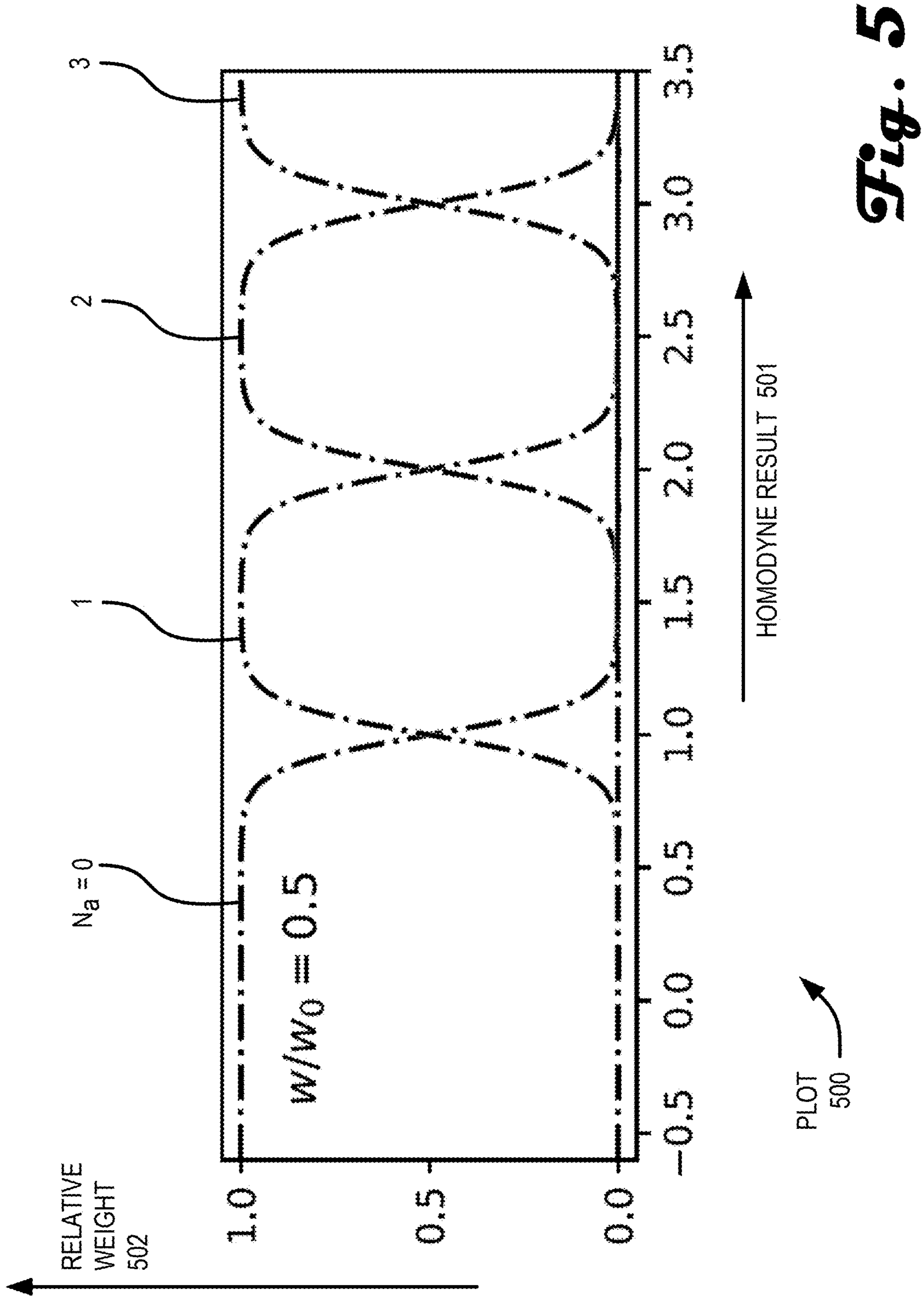
FIG. 5 plots relative weights of a squeezed-Fock-state projector in the POVM as another function of the homodyne result for various values of Na in which one or more improved technologies may be incorporated.

Referring now to FIG. 5, there is shown a plot 500 of relative weights 502 of squeezed-Fock-state projector $W_{Na}(p_b)$ in the POVM as a function of the corresponding homodyne result 501 ($p_b$/d) for $w/w_0=0.5$ for an $N_a$ of 0, 1, 2, and 3. We assume conditional displacement of d=~gt=1.0 for plots 400, 500.

In contrast to the phase-insensitive photon-number tomography attainable by conventional PNR QND measurements, our system 300 can perform PNR QND measurement in an arbitrary squeezed photon-number basis, enabling phase-sensitive squeeze tomography, from which we can obtain phase information about the state under tomographic reconstruction. Here, introducing a complex phase to the pump displacement β changes the rotation angle of the basis, while the ratio $$\frac{r}{\delta}$$

determines the squeezing factor. The measurement basis gets more squeezed for $$\frac{r}{\delta} \to 1,$$

where we can have a larger enhancement factor of nonlinear coupling $$\frac{\tilde{g}}{g}.$$

In the other limit of $$\frac{r}{\delta} \to 0,$$

the measurement basis converges to the (non-squeezed) photon-number state basis, which comes with a cost of vanishing effective nonlinear coupling $$\frac{\tilde{g}}{g} \to 0.$$

It is worth mentioning that additional Gaussian operations 197 can enable flexible control over the measurement basis without compromising the nonlinear coupling. For this purpose, we can apply a pair of opposite squeezing operations $\hat{S}_a$ and $$\hat{S}_a^\dagger$$

to the signal state before and after evolving under $\hat{H}_D$, respectively, which transforms the measurement basis so that $\hat{N}_{eff}=\hat{A}_{eff}^\dagger\hat{A}_{eff}$ is measured with $$\hat{A}_{eff} = \hat{S}_a^\dagger \hat{A} \hat{S}_a.$$

By choosing $\hat{S}_a$ such that $\hat{A}_{eff}=\hat{a}$, we realize a QND measurement of the normal photon number $\hat{n}_a=\hat{a}^\dagger\hat{a}$ without resorting to the limit of $$\frac{r}{\delta} \to 0.$$

such a pair of squeezing and antisqueezing operations was experimentally demonstrated on pulsed nonlinear nanophotonics as reported in R. Nehra, R. Sekine, L. Ledezma, Q. Guo, R. M. Gray, A. Roy, and A. Marandi, Few-cycle vacuum squeezing in nanophotonics, Science 377, 1333 (2022). Full analysis of the effects of loss of the external squeezing operations is provided in Appendix E.

Quantum State Engineering for Gottesman-Kitaev-Preskill States

While our focus so far has been on QND measurement of the signal excitations 163, we now show that one can also perform a QND measurement of the pump field quadratures using the same physics of the nonlinear OPA dynamics. For this, we utilize the operator dynamics under Eq. (9) as $$\hat{x}_b(t) = \hat{x}_b(0),\ \hat{A}(t) = e^{i(2\tilde{g}t\hat{x}_b(0)-\Delta t)}\hat{A}(0), \tag{16}$$

where the information about $2\tilde{g}t\hat{x}_b-\Delta t$ is encoded in the phase of $\hat{A}$ up to the modulo of 2π. Therefore, measuring the phase of $\hat{A}$, e.g., with a general-dyne measurement, indirectly infers the value of $\hat{x}_b$ modulo $$\mu = \frac{\pi}{\tilde{g}t},$$

which projects with pump mode to $\hat{x}_b=x_\phi$ (mod μ) for a phase measurement outcome of ϕ, where we denote $$x_\phi = \frac{\phi+\Delta t}{2\tilde{g}t} (\text{mod } \mu).$$

The pump quadrature $\hat{x}_b$ itself remains constant throughout the dynamics due to $[\hat{x}_b, \hat{H}_D]\approx 0$, which ensures QND nature of the measurement. Such modular quadrature measurements play central roles in contemporary CVQIP, e.g., for deterministic generation, stabilization, and quantum error correction with GKP states. In the following, we demonstrate a preparation of an approximate GKP state using the nonlinear dynamics of an OPA 160, where only additional Gaussian resources (i.e., Gaussian initial states, measurements, and feedforward operations) are used. Our proposal for generating GKP states adapts D. Gottesman, A. Kitaev, and J. Preskill, Encoding a qubit in an oscillator, Phys. Rev. A 64, 012310 (2001) and D. J. Weigand and B. M. Terhal, Realizing modular quadrature measurements via a tunable photon-pressure coupling in circuit QED, Phys. Rev. A 101, 053840 (2020). We provide technical differences herein that are significant for some embodiments, however, stemming from the nonlinear dynamics of phase-mismatched/frequency-detuned OPAs 160.

Figure 6:
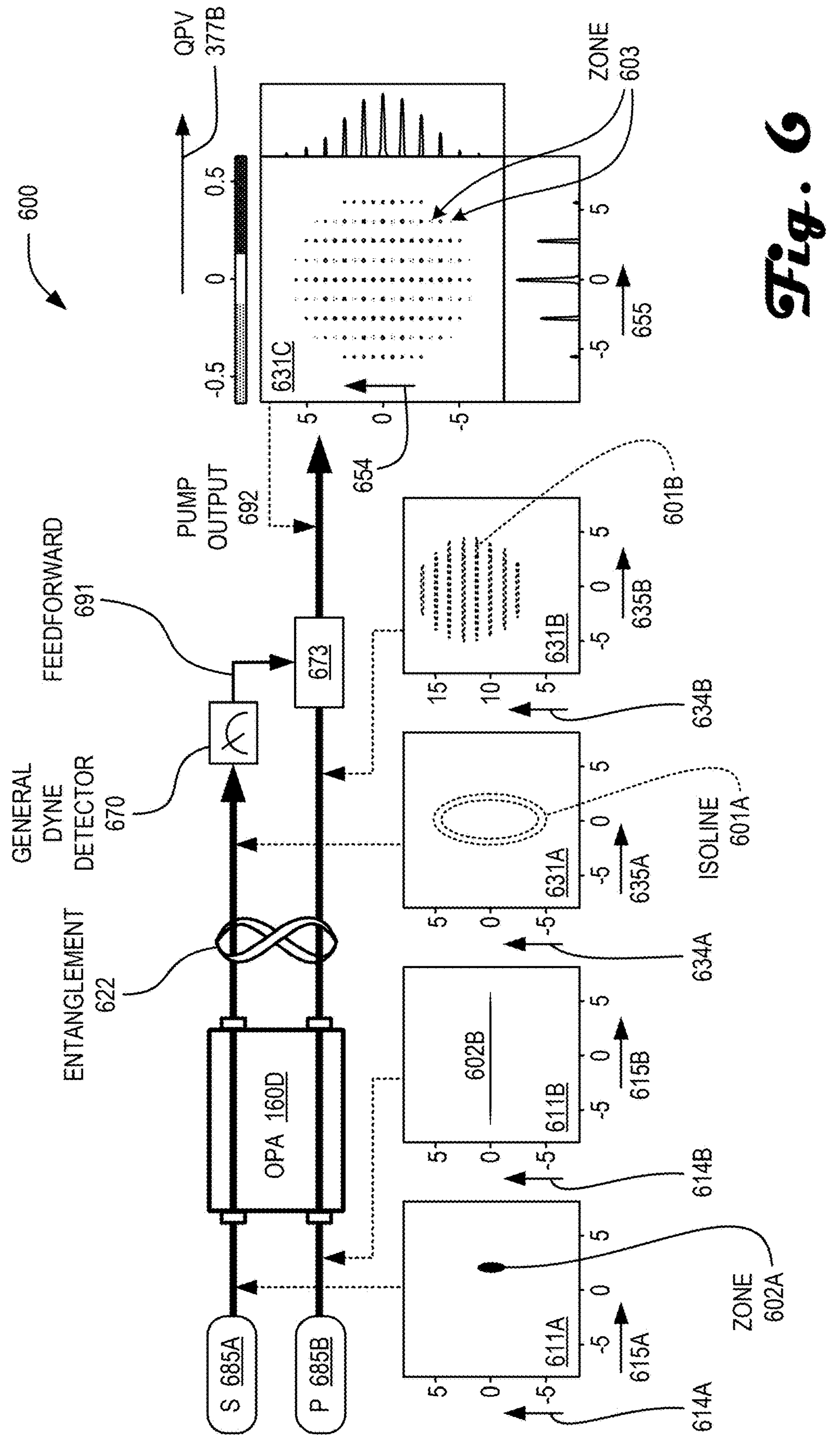
FIG. 6 depicts a system featuring at least one phase-mismatched OPA suitable for nonlinearity enhancement in which one or more improved technologies may be incorporated.

For the following discussions, we denote a coherent excitation of the Bogoliubov signal mode as $|A\rangle$. Physically, $|A\rangle$ is a displaced squeezed state and is an eigenstate of the operator $\hat{A}$ with eigenvalue A. As shown in FIG. 6, we prepare the initial signal state $|A_0\rangle$ with $A_0>0$ as a "meter" state for the phase shift. For the initial pump state, we assume a p-squeezed vacuum with width w along the p-quadrature.

After propagating through a nonlinear OPA 160D for time t, we perform a phase measurement on $\hat{A}$ by a complete general-dyne measurement 178A, which projects the signal mode on the measurement basis of displaced squeezed states $$\{|e^{i\phi}(A_0+\epsilon)\rangle\}. \tag{17}$$

This can occur, for example, when system 600 implements an instance of systems 100, 200 that does not use a detector 170A so as not to demolish a pump output 192, 692 of the system 100, 200, 600. Here, the measurement basis is parameterized by the radius $(A_0+\epsilon)\geq 0$ and the phase $\phi$. See Appendix F of the PRX article for full details on an implementation of a general-dyne measurement 178B. The performance of the phase measurement can be further improved by adaptive measurement schemes like those of H. M. Wiseman, Adaptive Phase Measurements of Optical Modes: Going Beyond the Marginal Q Distribution, Phys. Rev. Lett. 75, 4587 (1995) or M. A. Armen, J. K. Au, J. K. Stockton, A. C. Doherty, and H. Mabuchi, Adaptive Homodyne Measurement of Optical Phase, Phys. Rev. Lett. 89, 133602 (2002). For the preparation of a GKP state, a modulo quadrature measurement with modulus $\mu=\sqrt{2\pi}$ is desired, which sets the interaction time $$\tilde{g}t=\sqrt{\frac{\pi}{2}}.$$

When the magnitude of the meter state $A_0$ is much larger than the vacuum noise level, the measurement outcome is expected to be exponentially localized around $|\epsilon|<<A_0$. Assuming this condition is met, the post-measurement pump state approximately becomes $$|\varphi_b'\rangle\approx\hat{D}_b(x_\phi)\hat{D}_b(i\sqrt{\pi/2}\lfloor A_0\rfloor^2)|\tilde{0}\rangle, \tag{18}$$

which can be transformed to an approximate GKP logical state $$|\tilde{0}\rangle\propto\sum_{n=-\infty}^{\infty}e^{-\frac{w^2(n\sqrt{2\pi}+x_\phi)^2}{4}}\hat{D}_b(n\sqrt{2\pi})|\kappa\rangle \tag{19}$$

via one or more displacement operations 197 (see Appendix C below and in the PRX article for more details). Here, $\lfloor\bullet\rfloor$ is a floor function, and $|\kappa\rangle$ is an x-squeezed vacuum with width $$\kappa=\sqrt{\langle\hat{x}_b^2\rangle-\langle\hat{x}_b\rangle^2}=\frac{1}{2\sqrt{\pi}}A_0$$

along und x-quadrature. It is worth mentioning that this GKP generation is nearly deterministic, because an extra displacement $\hat{D}_b(\hat{x}_\phi)$ induced by the probabilistic phase readout $\phi$ can be largely compensated by the feedforward displacement operation(s) 197. The resultant GKP state becomes symmetric when $w=\kappa$ holds true, corresponding to $$A_0=\frac{1}{2\sqrt{\pi}}w.$$

In FIG. 6, a schematically depicted system 600 is shown that also indicates the results of our numerical simulations showing the generation of a symmetric GKP state with squeezing level of 15 dB (beyond the error correction threshold of ~10 dB). System 600 that can, in some variants, include or resemble system 100 or system 200 (or both). A phase-mismatched optical parametric amplifier 160D as shown receives a signal input 685A (e.g. a number 264 of SBEs 163) comprising state 611A and a pump input 685B comprising state 611B whereby the inputs 685A-B undergo an entanglement 622 and a selective nonlinear coupling strength enhancement.

FIG. 6 herein presents our PNR QND measurement scheme (also shown in FIG. 3 of the PRX article) using nonlinear quantum behavior of an OPA 160D, where the phase-space representation (i.e., Wigner functions) of the system state at each step of the protocol is shown using numerical data. For the numerical simulation, we consider an initial coherent signal state $|\varphi_a(0)\rangle=|a=0.7\rangle$ shown in state 611A plotting a sine component axis 614A ($p_a$ quadrature) against cosine component axis 615A ($x_a$ quadrature). Nominally elliptical zones 602A-B (shown in solid black) signals a quasi-probability value (QPV) 677B of about 0.2 or higher.

Dashed isolines 601A signal a smaller positive QPV 677B for state 631A in an annular zone of weakly positive QPV surrounding an ellipsoid zone of negligible QPV. Dashed isolines 601B likewise signal a smaller positive QPV 677B for state 631B in several eccentric ellipsoid zones of negligible QPV. An initial pump state 611B plots axis 614B ($p_b$) against axis 615B ($x_b$). The signal and pump states interact through a frequency-detuned OPA 160D whose dynamics respond to an information-bearing pump modular quadrature 162 as described above.

A general dyne detector 670 on the final signal state 631A acts as a QND measurement and provides a feedforward 691 to one or more displacement operators 673 that modulate the entangled pump state 631B to generate a pump output 692 having a state 631C that plots axis 654 ($p_b$) against axis 655 ($x_b$). A resulting pattern of state 631C provides alternating columns and rows of black zones (each signaling a QPV of about 0.2 or more) with a matrix of not-black zones 603 (each signaling a QPV of about −0.2 or less) as shown.

Because a supply of GKP states at one's disposal enables fault-tolerant universal quantum computation with only additional Gaussian resources, our result shows that a nonlinear OPA 160D is a sufficient component to realize universal nonlinear-optical QC. Compared to existing nonlinear-optical GKP state generation schemes using cross-phase modulation (XMPP), our apbroach employs a much stronger quadratic nonlinearities, which we believe offers great promise for non-Gaussian state engineering at room-temperature.

Nonlinear Quantum Fluctuations in OPO Dynamics

An important application of parametric interactions is an OPO (optical parametric oscillator), which is realized by pumping a quadratic nonlinear resonator with an external drive field 131. In the absence of signal loss, a phase-matched OPO (i.e., δ=0) has two transient states, i.e., odd and even signal cat states comprising of the quantum superposition of x-phase-shifted coherent states. The presence of a finite signal loss leads to spontaneous switching of the parity of the cat states, devolving the cat states into incoherent mixtures of the original coherent states, which is reminiscent of the spontaneous quantum jumps observed in a two-level atom-cavity QED system. Here, we show that a phase-mismatched OPO exhibits behavior reminiscent of multilevel atom-cavity QED, where the signal photon loss induces quantum jumps among the signal states in the squeezed Fock state ladder.

We introduce an external pump drive for an OPO given by the Hamiltonian term $\hat{H}_{drive}=i\lambda(\hat{b}_{\dagger}-\hat{b})$, and the outcoupling pump loss is characterized by the Lindblad operator $\hat{L}_b=\sqrt{\kappa_b}(\hat{b}+\beta)$ (In the laboratory frame $\hat{L}_b=\sqrt{\kappa_b}\hat{b}$. In the absence of signal loss, the pump operator dynamics follow $$i\partial_t\hat{b} = -\tilde{g}\left(\hat{N}_a + \frac{1}{2}\right) - \frac{i\kappa_b}{2}(\hat{b}+\beta) + i\lambda, \tag{20}$$

while $\hat{N}_a$ remains constant. For a choice of $$\lambda = \frac{\kappa_b\beta}{2},$$

we have stationary states $$|N_a\rangle|\beta_{N_a}\rangle \text{ for } N_a \in \mathbb{Z}^+, \tag{21}$$

where $|\beta_{Na}\rangle$ is a coherent pump state with displacement $$\beta_{N_a} = 2i\kappa_b^{-1}\tilde{g}\left(N_a + \frac{1}{2}\right).$$

Since $\beta_{N_a}$ depends on $N_a$, the pump photons leaving the OPO carry out information about $N_a$, which plays the role of a weak continuous QND measurement of $\hat{N}_a$. Thus, by monitoring the outcoupled pump field 131, the system (pump-signal) state is expected to conditionally collapse to one of the stationary states $|N_a\rangle|\beta_{Na}\rangle$.

Let us now consider the effects of a finite signal loss. When a signal photon is lost from $|\beta_{N_a}\rangle$, the intracavity signal state experiences a quantum jump as $|N_a\rangle \mapsto |Na\rangle$, resulting in the signal mode given as $$\cosh u\sqrt{N_a}|N_a-1\rangle - \sinh u\sqrt{N_a+1}|N_a+1\rangle. \tag{22}$$

This implies that a loss of a signal photon, corresponding to a photon subtraction from a squeezed photon-number state, induces a discrete jump of the Bogoliubov excitation $N_a \mapsto N_a \pm 1$, both in the positive and negative directions. Note that the flow is biased towards the negative direction because of coshu>sinhu.

Figure 7:
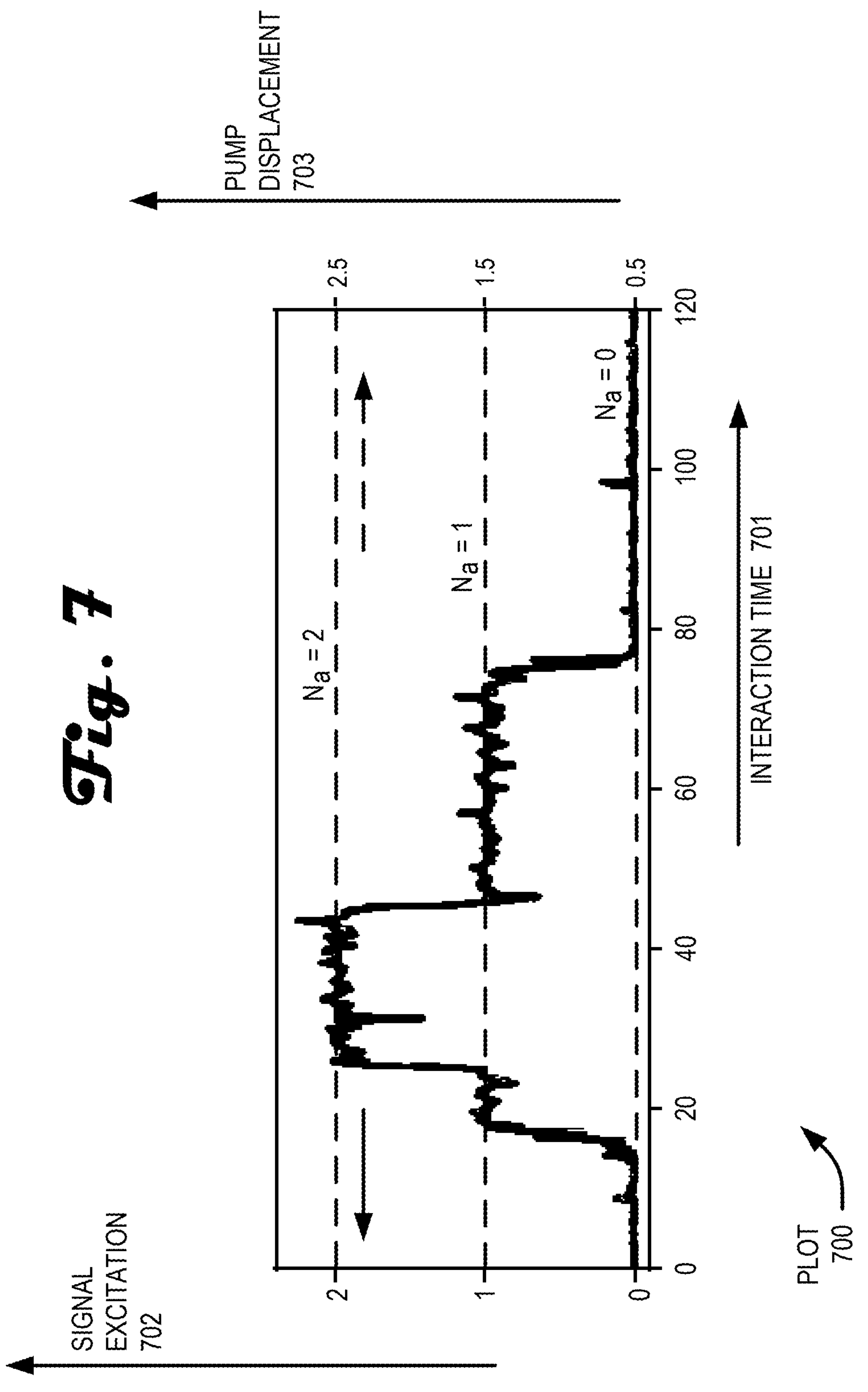
FIG. 7 depicts trajectories of signal excitation and pump displacement as a function of interaction time in which one or more improved technologies may be incorporated.
Figure 8:
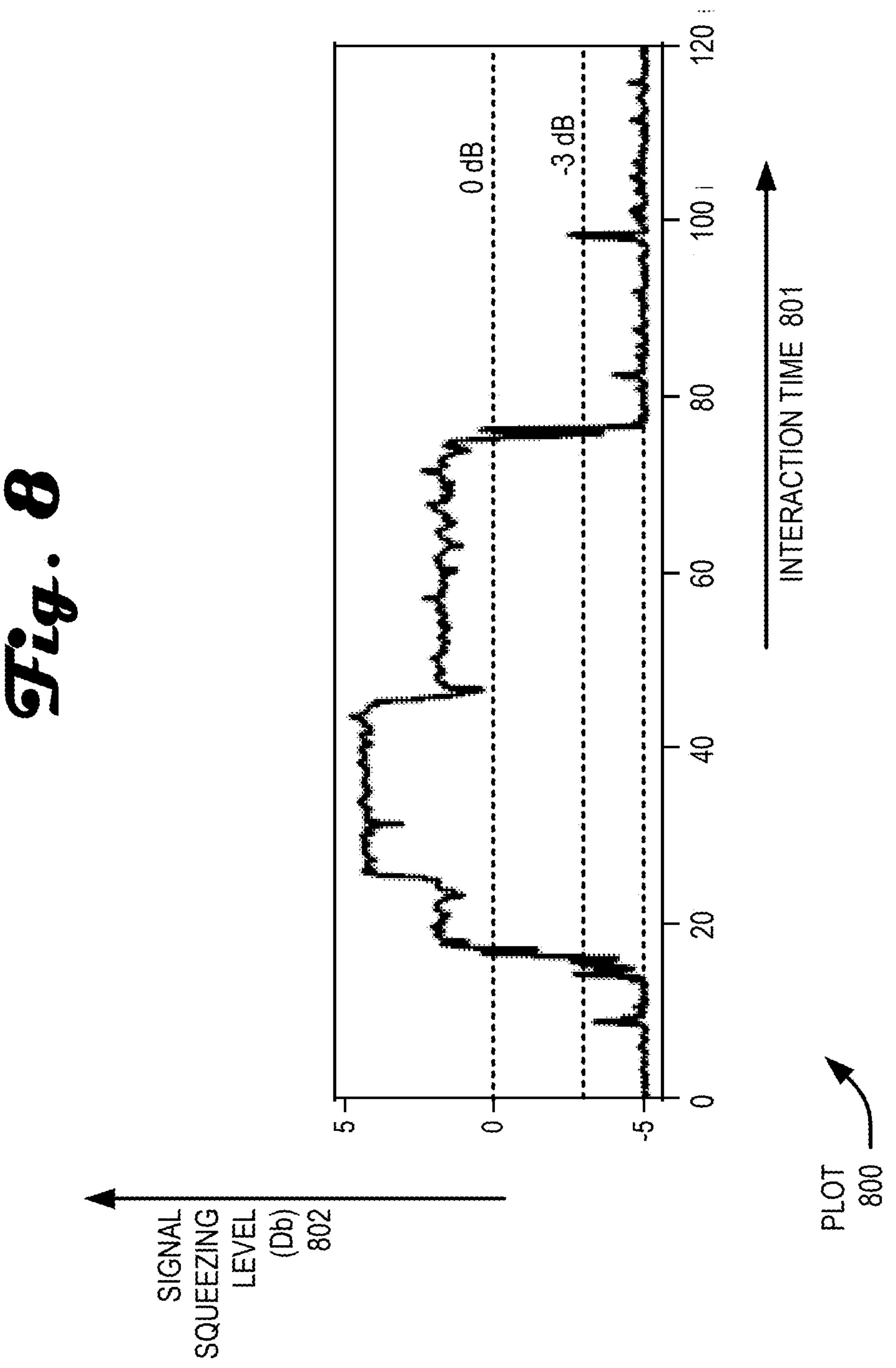
FIG. 8 depicts a signal x-quadrature squeezing level relative to corresponding quadrature noise levels in which one or more improved technologies may be incorporated.

Referring now to FIGS. 7-8 there is shown a stochastic master equation quantum trajectory of the OPO dynamics indicated by a continuous pump p-homodyne measurement. Plot 700 of FIG. 7 depicts trajectories of signal excitation 702 $\langle\hat{N}_a\rangle$ and pump displacement 703 $\langle\hat{p}_b\rangle$ *compared to the expected levels of the plateaus* $\langle\hat{p}_b\rangle$ =Im ($\beta_{N_a}$) at as a function of interaction time. Plot 800 of FIG. 8 depicts a trajectory of the signal x-quadrature squeezing compared to the quadrature noise levels for a vacuum (at the 0 dB dotted line) and the squeezing limit for an OPO steady-state (at the negative 3 dB dotted line). We use Eq. (9) with system parameters $$\frac{\Delta}{g} = 100,\ \frac{\tilde{g}}{g} = 1.5,\ \frac{\kappa_a}{g} = 0.03, \text{ and } \frac{\kappa_b}{g} = 3.0.$$

Because of the quantum correlations between $\hat{N}_a$ and $\hat{p}_b$, an occurrence of such a quantum jump can be inferred from the record on the pump homodyne measurement without monitoring the signal loss photons at all. To emulate this situation, we perform numerical simulations of a stochastic master equation (SME) indicated by a pump p-homodyne measurement, while we do not monitor signal loss photons. As shown in FIG. 7, we observe correlated spontaneous jumps in $\langle\hat{N}_a\rangle$ and $\langle\hat{p}_b\rangle$ showing multilevel plateaus corresponding to the production of squeezed photon-number states, which can be inferred solely from the pump homodyne record. Such discrete behaviors emerging from a continuous-variable system under the monitoring of only continuous observables are illuminating manifestations of the intrinsic quantum nature of photons. When the system is found in $|N_a=0\rangle|\beta_{N_a=0}\rangle$, the signal state is in a squeezed vacuum, whose squeezing level 802 can conditionally exceed the −3 dB limit of an OPO intracavity steady-state squeezing (see FIG. 8). Note that this phenomenon of strong signal squeezing differs markedly from the physics described in W. Qin, A. Miranowicz, and F. Nori, Beating the 3 dB Limit for Intracavity Squeezing and Its Application to Nondemolition Qubit Readout, Phys. Rev. Lett. 129, 123602 (2022), where more than 3 dB of squeezing is realized in the pump mode of an OPO.

Experimental Prospects

We discuss experimental features for the implementation of our PNR QND measurement in the single-photon regime. For this purpose, we assume large squeezing factors for all the fields involved in the dynamics, which in this case includes signal Bogoliubov excitation 163 and probe pump state 137, to study the potential of squeezing to enhance effective nonlinear coupling. Assuming similar level of loss and squeezing factors for signal and pump, i.e., $\kappa_a \sim \kappa_b$ and $w \sim e^{-u} << 1$, an experimental feature for some variants of our scheme becomes $$\frac{g}{\kappa_a} \gtrsim w \quad (23)$$

(see Appendix D of the PRX article for full discussions), where the squiggly symbols denote approximate equality (inequality) faithful up to factors of orders of unity. Notice is reduced by the squeezing of the probe pump mode 136. For instance, applying 15 dB of squeezing on the initial pump can approximately reduce the restrictiveness of $$\frac{g}{\kappa_a}$$

by a factor of $w^{-1} \sim 5.3$. A promising nonlinear-optical realization of Eq. (1) is by means of a high-Q microring resonator, where $$\frac{g}{\kappa_a} \sim 0.01$$

has been recently realized in the indium gallium phosphide nanophotonics and the thin-film lithium niobate nanophotonics. Moreover, ultrafast pulse operations enabled by advanced dispersion engineering can further enhance the nonlinear coupling by simultaneously leveraging both temporal and spatial field confinements, with which $$\frac{g}{\kappa_a} \sim 10$$

may be possible. When realized in a single-path manner, such an implementation with ultrashort pulses may enable PNR QND measurements with terahertz through rates. These numbers suggest bright prospects for the potential realization of this proposed scheme on near-term $\chi^{(2)}$ nonlinear nanophotonics.

In regard to the above disclosure, we have proposed and analyzed schemes for PNR QND measurement and quantum state engineering using the nonlinear quantum behavior of an OPA 160. We show that the pump mode driving a phase-mismatched OPA 160 experiences conditional displacements 261 depending on a number of signal Bogoliubov excitations 163 $\hat{N}_a$, enabling one to measure $\hat{N}_a$ nondestructively via a pump homodyne detection. Such PNR QND measurements allow for high-efficiency ultrafast PNR measurements (replacing the conventional slow superconducting detectors) and a deterministic implementation of photon-photon entangling gate, providing all the necessary elements for deterministic room-temperature DV photonic quantum computation at ultra-fast clock rates.

We then show that the nonlinear OPA dynamics can be utilized to realize a modular quadrature QND measurement of the pump mode via a signal phase measurement, which naturally provides a way to deterministically generate optical GKP states with additional all-Gaussian resources. Our results unlock many promising opportunities for room-temperature ultra-fast universal quantum computation with GKP states in CV architectures. It is worth mentioning that our GKP state generation protocol uses Gaussian quadrature measurements, which can be purified using recently demonstrated amplification techniques with high-gain linear OPAs 160 before the inefficient general-dyne measurements, thereby offering a way to generate highly pure GKP states. Finally, extending the discussions to OPO physics, we show that continuous homodyne monitoring of the outcoupled pump field 131 leads to conditional localization of the signal mode on squeezed photon-number states, thereby highlighting a unique opportunity to synthesize and characterize the intracavity nonclassical states in real time.

The above embodiments do not rely on materials with cubic nonlinearity, and thus provides a clear path for overcoming the longstanding challenge of the nonlinear-optical PNR QND schemes based on cross-phase modulation (XPM), where the self-phase modulation that inevitably accompanies XPM leads to detrimental phase noise to the probe field. Our work establishes a concise description of the nonlinear-optical parametric interactions beyond the conventional semiclassical picture, thereby showing a practical path toward large-scale, ultrafast, and fault-tolerant universal photonic quantum information processors at room temperatures.

With reference again to FIG. 3, there is shown a system 300 implementing a squeezed cat-state generation scheme using cubic QND measurement with optical parametric interactions. Wigner functions of the quantum states at each stage of the protocol are shown using data from full-quantum simulation. As the initial states, we prepare FH mode 385A and SH mode 385B in a p-squeezed vacuum state 311A with $\omega_a=\sqrt{5}/2$ and a vacuum state 311B, respectively. After propagating through one or more external squeezers 381A-B and one or more nonlinear media 382, we obtain the final unconditional FH state 331A and SH state (as-shown state 331B with marginal p-quadrature distribution 335B corresponding to $P(p_b)$). Depending on the outcome of the SH homodyne measurements 178, the FH mode is projected to squeezed Schrödinger's cat states 375). Each color band in (d) represents an interval of the SH homodyne measurement outcome $p_b$ that results in the ensemble-averaged state with a corresponding color in states 375 with a probability of $\alpha$. We set the intervals to $$p_b \in \left[\tau\xi^2/4 - \delta p_b/2,\ \tau\xi^2/4 + \delta p_b/2\right] \text{ with } \delta p_b = 0.5 \text{ and } \tau = 1.0 \quad (24)$$

to generate cat states with size $\in \{\sqrt{4}, \sqrt{8}, \sqrt{12}, \sqrt{16}\}$. We assume $$r_a^2 = r_b^2 = 10$$

for the squeezers, corresponding to 10 dB of power gain.

APPENDIX A: DERIVATIONS FOR THE ROTATING FRAME HAMILTONIAN

In providing the derivation for the Hamiltonian (1) we start from the single-mode $\chi^{(2)}$ Hamiltonian in the laboratory frame $$\hat{H} = g\left(\hat{a}^{\dagger 2}\hat{b} + \hat{a}^2\hat{b}^\dagger\right) + \omega_a\hat{a}^\dagger\hat{a} + \omega_b\hat{b}^\dagger\hat{b}. \quad (25)$$

We move to a rotating frame given by a unitary.

$$\hat{U} = \exp\left(i\frac{\omega_b t}{2}\hat{a}^\dagger\hat{a} + i\omega_b t\hat{b}^\dagger\hat{b}\right). \quad (26)$$

This transforms the Hamiltonian as $$\begin{aligned}\hat{H} &\mapsto \hat{U}\hat{H}\hat{U}^\dagger + i(\partial_t\hat{U})\hat{U}^\dagger \\ &= g(\hat{a}^{\dagger 2}\hat{b} + \hat{a}^2\hat{b}^\dagger) + \delta\hat{a}^\dagger\hat{a}\end{aligned}, \quad (27)$$

with the frequency detuning $\delta=\omega_a-\omega_b/2$.

APPENDIX B: KRAUS OPERATORS FOR PNR DETECTION

In this section, we derive the Kraus operators of the PNR QND measurement implemented with the Hamiltonian $\hat{H}_D$. For the pump p-homodyne outcome of $p_b$, post-measurement signal state becomes $$|\varphi_a'(p_b)\rangle = \langle p_b|e^{-i\hat{H}_D t}|\varphi_a(0)\rangle|\varphi_b(0)\rangle \quad (28)$$

up to normalization, where $|p_b\rangle$ is an engenstate of $\widehat{p_b}$ with an eigenvalue $p_b$. For the target signal state $$|\varphi_a(0)\rangle = \sum_{N_a=0}^{\infty}\alpha_{N_a}|N_a\rangle, \quad (29)$$

we have $$\begin{aligned}|\varphi_a'(p_b)\rangle &= \left\langle p_b\right|\sum_{N_a=0}^{\infty}\alpha_{N_a}e^{-i\Delta N_a t}\hat{D}_b(\gamma_{N_a})|N_a\rangle\left|\varphi_b(0)\right\rangle \\ &= \sum_{N_a=0}^{\infty}\alpha_{N_a}C_{N_a}(p_b)|N_a\rangle\end{aligned}, \quad (30)$$

with $$\gamma_{N_a} = id\left(N_a + \frac{1}{2}\right)$$

and $$C_{N_a}(p_b) = e^{-i\Delta N_a t}\langle p_b - d(N_a + 1/2)|\varphi_b(0)\rangle. \quad (31)$$

Eq. (30) can be summarized as $$|\varphi_a'(p_b)\rangle = \hat{M}(p_b)|\varphi_a(0)\rangle \quad (32)$$

using Kraus operators $$\hat{M}(p_b) = \sum_{N_a=0}^{\infty}C_{N_a}(p_b)|N_a\rangle\langle N_a|. \quad (33)$$

Assuming a squeezed vacuum with width w along the p-quadrature as the pump probe state $|\varphi_b(0)\rangle$, we can analytically write down the complex probability amplitude $$C_{N_a}(p_b) = \frac{e^{-i\Delta N_a t}e^{-\frac{1}{4w^2}\left(p_b - d\left(N_a+\frac{1}{2}\right)\right)^2}}{(2\pi)^{1/4}w^{1/2}}, \quad (34)$$

which is a Gaussian function centered around $$p_b = d\left(N_a + \frac{1}{2}\right)$$

with width w.

The positive valued operator measure (POVM) of the QND measurement protocol $\hat{F}(p_b)$ can be readily obtained from the Kraus operators as $$\begin{aligned}\hat{F}(p_b) &= \hat{M}^\dagger(p_b)\hat{M}(p_b) \\ &= \sum_{N_a=0}^{\infty}|C_{N_a}(p_b)|^2|N_a\rangle\langle N_a|\end{aligned}. \quad (35)$$

Notice that the POVM fulfills a normalization condition $\int dp_b \hat{F}(p_b)=\mathbb{1}_a$.

It is worth mentioning that the POVM (35) is not completely selective with respect to $N_a$, because the POVM is composed of a mixture of multiple squeezed-Fock-state projectors. For quantitative characterizations of such mixedness of the POVM, we introduce relative weights of squeezed-Fock-state projectors $$W_{N_a}(p_b) = \frac{|C_{N_a}(p_b)|^2}{\sum_{N_a'=0}^{\infty}|C_{N_a'}(p_b)|^2}. \quad (36)$$

To understand the physical interpretation of $W_{N_a}(p_b)$, it is insightful to consider how the squeezed photon number distribution of a premeasurement state (29), i.e., $$|\langle N_a|\varphi_a(0)\rangle|^2 = |\alpha_{N_a}|^2, \quad (37)$$

changes conditioned on the homodyne outcome $p_b$. Using Eq. (32), we can denote the squeezed photon number distribution of the post measurement state as $$|\langle N_a|\varphi_a'(p_b)\rangle|^2 = \mathcal{N}|\alpha_{N_a}|^2 W_{N_a}(p_b), \quad (38)$$

with normalization constant N. Comparing Eqs. (37) and (38), we can interpret $\{W_{N_a}(p_b)\}$ as conditional weights that are multiplied to the squeezed photon number distribution of the input state $|a\ Na|^2$. In particular, when $W_{N_a}(p_b)=1$ holds for a certain $N_a$, the post measurement state becomes a pure squeezed photon-number state $|N_a\rangle$.

APPENDIX C: ALL-GAUSSIAN GENERATION OF GKP STATES

In this section, we introduce the generation scheme of GKP states by means of a modular quadrature measurement using the nonlinear quantum behavior of an OPA 160. In some variants we incorporate the protocols using ponderomotive interactions presented in D. Gottesman, A. Kitaev, and J. Preskill, Encoding a qubit in an oscillator, Phys. Rev. A 64, 012310 (2001) and in D. J. Weigand and B. M. Terhal, Realizing modular quadrature measurements via a tunable photon-pressure coupling in circuit QED, Phys. Rev. A 101, 053840 (2020).

For the following discussions, we denote a coherent excitation of the signal Bogoliubov excitation as $|A\rangle$. Physically, $|A\rangle$ is a displaced squeezed state and is an eigenstate of $\hat{A}$ with an eigenvalue A. As an initial system state, we consider $$|\varphi|(0)\rangle = |A_0\rangle \int dx_b \varphi_b(x_b)\,|x_b\rangle, \tag{39}$$

with $A_0>0$, and $\varphi_b(x_b)$ represents the x-quadrature amplitude of the initial pump state. After propagation through a phase-mismatched OPA 160 for time t, we measure the phase of the signal mode via a general-dyne measurement. This projects the signal state on a measurement basis spanned by states $|e^{i\varphi}(A_0+\epsilon)\rangle$ is parameterized by the radius $A_0+\epsilon\geq 0$ and the phase $\varphi$. Details for the construction of a general-dyne measurement are provided in Appendix F of the PRX article.

For a given measurement outcome of $\epsilon$ and $\phi$, the post-measurement pump state becomes $$\begin{aligned}|\varphi_b'\rangle &= \langle e^{i\phi}(A_0+\epsilon)|e^{-i\hat{H}_D t}|A_0\rangle|\varphi_b(0)\rangle \\ &= \int dx_b \langle A_0+\epsilon\,|\,e^{i(2\tilde{g}tx_b-\Delta t-\phi)}A_0\rangle\,\varphi_b(x_b)\,|x_b\rangle\end{aligned} \tag{40}$$

up to normalization. As a result, we can write the Kraus operators representing the measurement protocol as $$\hat{M}(\epsilon,\phi) = \sqrt{\frac{A_0+\epsilon}{\pi}} \int dx_b C_{x_b}(\epsilon,\phi)\,|x_b\rangle\langle x_b|, \tag{41}$$

where $$C_{x_b}(\epsilon,\phi) = \exp\left\{-\frac{1}{2}\left(A_0^2+(A_0+\epsilon)^2 - 2A_0(A_0+\epsilon)e^{i(2\tilde{g}tx_b-\Delta t-\phi)}\right)\right\} \tag{42}$$

is a complex amplitude.

When we employ a "meter" signal state with an amplitude much greater than the noise level of a vacuum, the outcome of the signal measurement is expected to be exponentially localized around $|\epsilon|<<A_0$. Assuming that this condition is met, we can approximate Eq. (42) as $$C_{x_b}(\epsilon,\phi) \approx \sum_{n=-\infty} \exp\{-2A_0^2(\tilde{g}t)^2(x_b-x_n-x_\phi)^2\} \times \exp\{2iA_0^2\tilde{g}t(x_b-x_n-x_\phi)\}, \tag{43}$$

where $x_n=n\mu$ and $$x_\phi = \frac{\Delta t+\phi}{2\tilde{g}t} (\mathrm{mod}\ \mu)$$

with $$\mu = \frac{\pi}{\tilde{g}t}.$$

Notice that Eq. (43) exhibits multiple Gaussian peaks with width $$\kappa = \frac{1}{2\sqrt{\pi}} A_0$$

separated by an equal distance $\mu$.

For the generation of a GKP state, we specifically consider a p-squeezed pump state $$\varphi_b(x_b) = \frac{w^{1/2}}{(2\pi)^{1/4}} e^{-\frac{w^2x_b^2}{4}}, \tag{44}$$

whose width along the p-quadrature is w. Also, we set the interaction time to $$\tilde{g}t = \sqrt{\frac{\pi}{2}}$$

so that $\mu=\sqrt{2\pi}$. For these parameters, the post-measurement pump state becomes $$\begin{aligned}|\varphi_b'\rangle &\approx \sum_{n=-\infty}^{\infty} \int dx_b e^{-\frac{w^2x_b^2}{4}} \exp\{-2A_0^2(\tilde{g}t)^2(x_b-x_n-x_\phi)^2\} \\ &\quad \exp\{2iA_0^2\tilde{g}t(x_b-x_n-x_\phi)\}\,|x_b\rangle \\ &\approx \sum_{n=-\infty}^{\infty} e^{-\frac{w^2(x_n-x_\phi)^2}{4}} \hat{D}_b(x_\phi)\hat{D}_b(x_n)\hat{D}_b\left(i\sqrt{\pi/2}\,A_0^2\right)|\kappa\rangle \\ &= \hat{D}_b(x_\phi)\hat{D}_b\left(i\sqrt{\pi/2}\,A_0^2\right)\sum_{n=-\infty}^{\infty} e^{-i\sqrt{2\pi}A_0^2x_n} \times \\ &\quad e^{-\frac{w^2(x_n-x_\phi)^2}{4}}\hat{D}_b(x_n)\,|\kappa\rangle,\end{aligned} \tag{45}$$

where we have ignored overall normalization constants. Here, $|\kappa\rangle$ is an x-squeezed vacuum with width k along the x-quadrature. Assuming that $|\kappa\rangle$ is strongly squeezed, we can perform an approximation $$e^{-i\sqrt{2\pi}A_0^2 x_n}\hat{D}_b(x_n)|\kappa\rangle = e^{-2\pi i n A_\theta^2}\hat{D}_b(x_n)|\kappa\rangle \tag{46}$$
$$= e^{-2\pi i n(A_0^2-\lfloor A_0^2\rfloor)}\hat{D}_b(x_n)|\kappa\rangle$$
$$= e^{-i\sqrt{2\pi}(A_0^2-\lfloor A_0^2\rfloor)x_n}\hat{D}_b(x_n)|\kappa\rangle$$
$$\approx e^{-i\sqrt{2\pi}(A_0^2-\lfloor A_0^2\rfloor)\hat{x}}\hat{D}_b(x_n)|\kappa\rangle$$
$$= \hat{D}_b\left(-i\sqrt{\pi/2}\left(A_0^2-\lfloor A_0^2\rfloor\right)\right)\hat{D}_b(x_n)|\kappa\rangle,$$

where $\lfloor\bullet\rfloor$ is a floor function. This allows us to rewrite the post-measurement state as $$|\varphi_b'\rangle \approx \hat{D}_b(x_\phi)\hat{D}_b\left(i\sqrt{\pi/2}\lfloor A_0^2\rfloor\right)|\tilde{0}\rangle, \tag{47}$$

where $$|\tilde{0}\rangle \propto \sum_{n=-\infty}^{\infty} e^{-\frac{w^2(n\sqrt{2\pi}+x_\phi)^2}{4}}\hat{D}_b(n\sqrt{2\pi})|\kappa\rangle \tag{48}$$

is an approximate GKP logical state. Notice that feedforward displacement operations based on the general-dyne measurement result can transform Eq. (47) to an approximate GKP state.

APPENDIX D: EXPERIMENTAL DESIGN FEATURES FOR THE PNR QND MEASUREMENT

In this section we study the experimental features and conditions for an implementation of a PNR QND measurement scheme in the single-photon regime. In the presence of dissipation, the density matrix for the system state follows the master equation $$\frac{d\hat{\rho}}{dt} = -i[\hat{H},\hat{\rho}] + \sum_{j\in[a,b]}\left(\hat{L}_j^\dagger\hat{\rho}\hat{L}_j - \frac{1}{2}\{\hat{\rho},\hat{L}_j^\dagger\hat{L}_j\}\right), \tag{49}$$

where $\{\hat{O}_1, O_2\}=\hat{O}_1\hat{O}_2+\hat{O}_2\hat{O}_1$ is an anti-commutator. In the main text, we have assumed the dynamical time scale of the phase rotation of the Bogoliubov excitation Δ dominates over the nonlinear coupling rate, i.e., Δ>>g. Here, we further assume that Δ dominates over the time scale of dissipation as well, i.e., $\Delta >> \kappa_a$, $\kappa_b$. When this assumption holds, by virtue of the rotating wave approximation, we are justified to ignore contributions from the rapidly rotating terms terms containing $\hat{A}^2$ and $\hat{A}^{\dagger 2}$ in Eq. (49). Specifically, for the terms describing signal loss, we have $$\hat{L}_a^\dagger\hat{\rho}\hat{L}_a - \frac{1}{2}\{\hat{\rho},\hat{L}_a^\dagger\hat{L}_a\} \approx \sum_{j\in[+,-]}\hat{L}_j^\dagger\hat{\rho}\hat{L}_j - \frac{1}{2}\{\hat{\rho},\hat{L}_j^\dagger\hat{L}_j\}, \tag{50}$$

with $\hat{L}_+=\kappa_a$ sinh (u) $\hat{A}^\dagger$ and $\hat{L}\_=\sqrt{\kappa_a}$ cosh (u) $\hat{A}^\dagger$. This result indicates that, under a rotating-wave approximation, we can decompose the effect of the original signal Lindblad operator $\hat{L}_a=\sqrt{\kappa_a}\hat{a}$ into that of two Lindblad operators $\hat{L}_+$ and $\hat{L}\_$.

In the following discussions, for concreteness, we consider a squeezed single-photon state |N_a=1}$ as an initial signal state. For the initial pump state, we assume p-squeezed vacuum with width w along the p-quadrature. For a successful PNR QND measurement, the probability for a quantum jump to occur in the signal mode should be sufficiently low. In the low-loss limit, the probability for a quantum jump is approximately given as $$P_{jump} = 1 - \left\langle N_a = 1\middle|e^{-\hat{L}_a^\dagger\hat{L}_a t}\middle|N_a = 1\right\rangle \tag{51}$$
$$\approx 1 - \left\langle N_a = 1\middle|e^{-\left(\hat{L}_+^\dagger\hat{L}_+ + \hat{L}_-^\dagger\hat{L}_-\right)t}\middle|N_a = 1\right\rangle$$
$$= 1 - \left\langle N_a = 1\middle|e^{-\kappa_a\left(cosh(2u)\hat{N}_a + sinh^2(u)\right)t}\middle|N_a = 1\right\rangle$$
$$= 1 - e^{-\kappa_a\left(3cosh^2(u)-2\right)t}$$

which sets a characteristic timescale for the loss-induced quantum jump as $$t_{jump} \sim \frac{1}{\cosh^2(u)\kappa_a}.$$

To be able to measure $\hat{N}_a$ with "high" confidence, the conditional displacement occurring over the time scale of $t_{jump}$ needs to be greater than the characteristic width of the pump state. Now, in the presence of finite but small pump loss, the width of the final pump state along the p-quadrature becomes $$w'^{(t)} = \sqrt{w^2 e^{-\kappa_b t} + \frac{(1-e^{-\kappa_b t})}{4}} \tag{52}$$
$$\approx \sqrt{w^2 + \left(\frac{1}{4} - w^2\right)\kappa_b t},$$

where we have assumed $\kappa_b$t<<1. As a result, experimental condition for a successful implementation of our scheme becomes $\tilde{g}t_{jump} \geq w'(t_{jump})$. Here, we use the squiggly symbol to denote approximate equality up to factors with orders of unity. Here, we assume strong squeezing for present purposes (e.g. signal Bogoliubov excitation and the pump state). Also, we assume similar level of loss and squeezing for both signal and pump, i.e., $\kappa_a \sim \kappa_b$ and $w \sim e^{-u} << 1$. Under these conditions, the order of magnitude of $w'(t_{jump})$ is larger than w only by a factor of unity, allowing us to approximate $w'(t_{jump}) \sim w$. As a result, we obtain a concise expression for the experimental design feature for our scheme as $$\frac{g}{\kappa_a} \gtrsim w. \tag{53}$$

Appendix E of the PRX article describes loss analysis for external squeezers, model the loss of each squeezer by a pair of equal beam splitters placed before and after the squeezer.

Appendix F of the PRX article describes construction of a general-dyne measurement using two balanced homodyne detectors and one ancillary vacuum state. The overall measurement protocol projects the input state |ϕ⟩ 1 to a measurement basis spanned by displaced squeezed states. The outcome of the general-dyne measurement is related to the outcomes of the homodyne detectors via x+ip=sec $\theta x_1$+i csc $\theta p_2$. The level of squeezing of the measurement basis ξ=tan θ with that configuration can be set via the choice of the beam splitter (BS) transmissivity.

With Reference to the Oph Article

We propose a scheme to realize cubic quantum nondemolition (QND) Hamiltonian with optical parametric interactions. We show that strongly squeezed fundamental and second harmonic fields propagating in a $\chi^{(2)}$ nonlinear medium effectively evolve under a cubic QND Hamiltonian. We highlight the versatility offered by such Hamiltonian for engineering non-Gaussian quantum states, such as Schrödinger cat states and cubic phase states. We show that these generation schemes can be highly tolerant against various sources of loss, e.g., detector inefficiencies and outcoupling loss in off-chip measurements. Our proposal involves operating the parametric interactions in a mesoscopic photon-number regime, which significantly enhances the effective nonlinear coupling from the native single-photon coupling rate and provides powerful means to fight photon loss. Experimental numbers suggest that our scheme might be feasible in the near future, particularly with pulsed nonlinear nanophotonics.

Engineering non-classical states of light is a central task in photonic quantum information processing and engineering, enabling novel architectures surpassing classical limitations in various fields, including metrology, sensing, communication, and computation. In some variants, the generation of an initial non-classical resource state can be the only nontrivial step for universal quantum operations, as evidenced by the discovery of one-way optical quantum computation (QC). For continuous-variable (CV) systems, an arbitrary unitary operation can be realized only with additional Gaussian (i.e., linear-optical) resources, provided that we have access to non-Gaussian resource states, e.g., Schrödinger's cat states, Gottesman-Kitaev-Preskill (GKP) states, or cubic phase states.

A conventional approach to non-Gaussian quantum state engineering is to leverage the nonlinearity induced by photon-number-resolving (PNR) measurements, which allows one to engineer highly non-classical states using complex optical circuits. However, the intrinsic probabilistic nature of these operations and cryogenic requirements of conventional PNR detectors (e.g., superconducting nanowires and transition-edge sensors) severely limit the overall scalability of the architecture.

In this work, we show a scheme to engineer a cubic quantum nondemolition (QND) Hamiltonian ∝

$$\hat{x}_a^2\hat{x}_b$$

proposing a means to circumvent the limitations of conventional approaches in CV quantum information and engineering. Here, operators $\hat{x}_a$ and $\hat{x}_b$ are the amplitude quadrature operators for the fundamental and second-harmonic fields, respectively. The cubic QND Hamiltonian can play a versatile role in non-Gaussian quantum engineering. First, it directly enables the deterministic implementation of a cubic QND gate, which completes a universal gate set for CVQC. Second, it enables the efficient generation of non-Gaussian quantum states only using additional Gaussian operations 197 and measurements 178. To highlight the latter point, we introduce schemes to generate a Schrödinger's cat state and a cubic phase state, analyzing their performance. Our protocol employs only homodyne conditioning without photon counting and thus is compatible with the pre-amplification scheme that makes it robust against loss at the detection stage, e.g., detector inefficiencies and outcoupling loss in off-chip measurements. Also, our scheme naturally involves the mesoscopic number of photons, which enhances effective nonlinear coupling from its native value by orders of magnitudes, providing a means to fight photon loss. Experimental numbers suggest that our approach may be viable in the near future, particularly using pulsed nonlinear nanophotonics.

We consider a resonant, single-mode $\chi^{(2)}$ nonlinear system with a Hamiltonian $$\hat{H} = -g\left(\hat{a}^2\hat{b}^\dagger + \hat{a}^{\dagger 2}\hat{b}\right) \quad (54)$$

where g>0 is the nonlinear coupling constant, and $\hat{a}$ and $\hat{b}$ are the annihilation operators for the FH and the SH modes, respectively. The Hamiltonian in Eq. (54) can be realized with various systems, including micro resonators, temporally trapped ultrashort pulses, and superconducting microwave circuits. Our results do not rely on a specific physical implementation of the Hamiltonian. For an initial system state of $$|\varphi(0)\rangle = |\varphi_a(0)\rangle|\varphi_b(0)\rangle. \quad (55)$$

we apply a pair of orthogonal squeezing operations $\hat{S}_a\hat{S}_b$ and $$\hat{S}_b^\dagger\hat{S}_a^\dagger$$

before and after the state evolves under the Hamiltonian in Eq. (54). As a result, the total system evolves $$|\varphi(t)\rangle = \hat{S}_b^\dagger\hat{S}_a^\dagger e^{-i\hat{H}t}\hat{S}_a\hat{S}_b|\varphi(0)\rangle = e^{-i\hat{H}_{eff}t}|\varphi(0)\rangle \quad (56)$$

where an effective Hamiltonian $\hat{H}_{eff}$ is obtained via substitutions $$\hat{a} \mapsto \hat{S}_a^\dagger\hat{a}\hat{S}_a \text{ and } \hat{b} \mapsto \hat{S}_b^\dagger\hat{b}\hat{S}_b$$

in H. For the following discussion, we take $$\hat{S}_c^\dagger\hat{c}\hat{S}_c = r_c\hat{x}_c + ir_c^{-1}\hat{p}_c$$

with $$\hat{x}_c = \frac{\hat{c}+\hat{c}^\dagger}{2},$$

$$\hat{p}_c = \frac{\hat{a}-\hat{c}^\dagger}{2i},$$

and field gain $r_c \geq 1$ for c ∈ {a, b}. As a result, we have $$\begin{aligned}\hat{H}_{eff} &= -2gr_b\left(r_a^2\hat{x}_a^2 - r_a^{-2}\hat{p}_a^2\right)\hat{x}_b - 2gr_b^{-1}(\hat{x}_a\hat{p}_a + \hat{p}_a\hat{x}_a)\hat{p}_b \\ &= 2g_{eff}\hat{x}_a^2\hat{x}_b + O\left(r_a^0r_b^{-1}\right) + O\left(r_a^{-2}r_b\right)\end{aligned} \quad (57)$$

with $$g_{eff} = r_a^2 r_b g,$$

which effectively realizes a cubic QND Hamiltonian $\hat{H}_{eff}$ $$\propto \hat{x}_a^2 \hat{x}_b.$$

Notably, such cubic QND Hamiltonian enables a universal gate set for CVQC, for which our scheme provides a deterministic implementation. Assuming $r_c >> 1$, the time evolution under $\hat{H}_{eff}$ can be approximately solved in the Heisenberg picture to give $$\hat{x}_a(\tau) = \hat{x}_a(0) \quad \hat{p}_a(\tau) = \hat{p}_a(0) + 2\tau\hat{x}_a(0)\hat{x}_b(0) \qquad (58)$$
$$\hat{x}_b(\tau) = \hat{x}_b(0) \quad \hat{p}_b(\tau) = \hat{p}_b(0) + \tau\hat{x}_a^2(0)$$

with a normalized interaction time $\tau = g_{eff}t$, implying that the SH quadrature operator $\hat{p}_p$ experiences conditional displacement depending on the value of $$\hat{x}_a^2.$$

Note that $$\left[\hat{H}_{eff}, \hat{x}_a^2\right] \approx 0$$

ensures that $$\hat{x}_a^2$$

remains constant during the system evolution, enabling us to perform a QND measurement of squared quadrature $$\hat{x}_a^2$$

by measuring $\hat{p}_b$ with a homodyne measurement.

Figure 9:
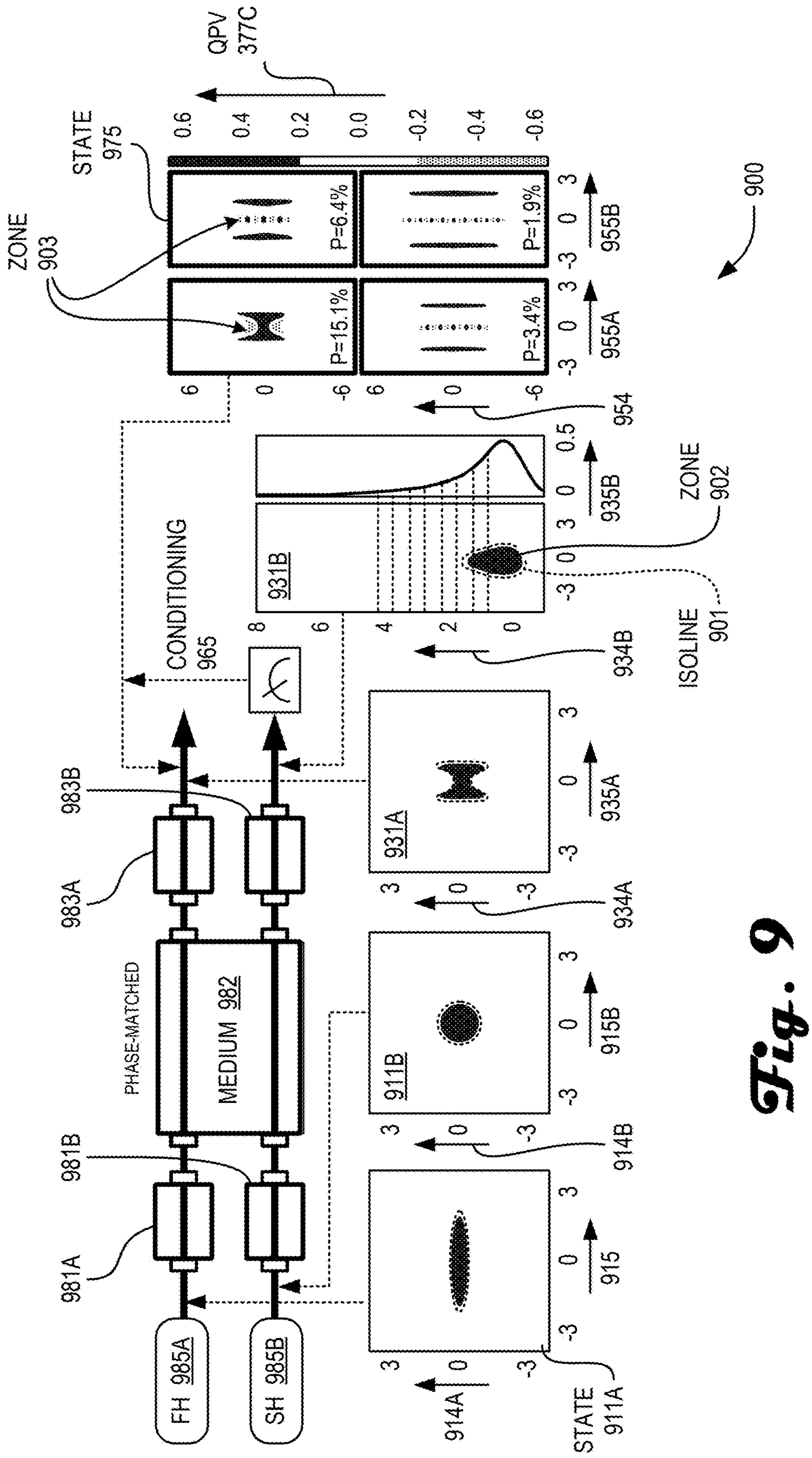
FIG. 9 depicts a system featuring at least one phase-matched OPA suitable for nonlinearity enhancement in which one or more improved technologies may be incorporated.

An overview of a system 900 that implements a QND measurement protocol of squared quadrature is illustrated in FIG. 9, also summarizing results of our numerical simulations shown in FIG. 1 of the Oph article. System 900 can, in some variants, include or resemble system 100 or system 200 (or both). Respective media 981A-B and at least one phase-matched optical parametric amplifier 160 (e.g. comprising medium 982) receive a fundamental harmonic 985A comprising state 911A and a second harmonic 985B comprising state 911B. State 911A plots a sine component axis 914A ($p_a$ quadrature) against a cosine component axis 915A ($x_a$ quadrature). Nominally elliptical zones 902 therein (shown in solid black) signal quasi-probability values (QPV) 377C of about 0.2 or higher. State 911B likewise plots axis 914B ($p_b$) against axis 915B ($x_b$) in a less-eccentric elliptical zone 902 of high QPV 377C.

Downstream from additional media 983A-B as shown are states 931A-B having zones 901 of high QPV 377C (shown in black) and weaker positive QPV 377C (bounded on the outside by dashed isolines 901 and on the inside by solid black zones 902). Homodyne conditioning 965 is applied as shown so that respective states 975 plotting a $p_a$ axis 954 against a corresponding $x_a$ axis 955A-B for various elements of state to support an inference as further described below.

The Kraus operators characterizing the QND measurement scheme are given as functions of the SH p-homodyne measurement outcome $p_b$ $$\hat{M}(p_b) = \int dx_a C_{p_b}(x_a)|x_a\rangle\langle x_a|, \qquad (59)$$

where the complex amplitude $$C_{p_b}(x_a) = \varphi_b\left(p_b - \tau x_a^2\right)$$

is given as a function of the initial probe SH state $$|\varphi_b(0)\rangle = \int dp_b \varphi_b(p_b)|p_b\rangle. \qquad (60)$$

Here, $|p_b\rangle$ is an eigenstate of $\hat{p}_b$ with an eigenvalue $p_b$ (and similarly for $|x_a\rangle$ ). Physically, the probability distribution for the homodyne outcome $p_b$ is given by the Born rule $$P(p_b) = \||\varphi'(p_b)\rangle\|^2, \text{ where } |\varphi_a'(p_b)\rangle = M(p_b)|\varphi_a(0)\rangle \qquad (61)$$

is the unnormalized post-measurement FH state. For general discussion on optical implementations of nonlinear quantum measurements readers may also refer to J. M. Epstein, K. Birgitta Whaley, and J. Combes, Quantum limits on noise for a class of nonlinear amplifiers, Phys. Rev. A 103, 052415 (2021).

The resolution of the QND measurement depends critically on the p-quadrature fluctuation of the probe SH state, which can be naturally improved by employing a p-squeezed vacuum as the probe state $|\varphi_b(0)\rangle$ . Note that such squeezing present in $|\varphi_b(0)\rangle$ can be absorbed into the initial SH squeezing operation $\hat{S}_b$, and thus, we can assume $|\varphi_b(0)\rangle = |0\rangle$ without loss of generality. Also, the imbalance between the first and second SH squeezing operations can be accounted for via a trivial scaling of the final SH p-homodyne readout. Therefore, in the following, we assume $|\angle_b(0)\rangle = |0\rangle$ unless otherwise specified.

With a vacuum probe state $|\varphi_b(0)\rangle = |0\rangle$ , we have $$C_{p_b}(x_a) = \left(\frac{2}{\pi}\right)^{\frac{1}{4}} e^{-(p_b - \tau x_a^2)^2},$$

which, when $p_b$ is much larger than vacuum fluctuations, can be approximated as a sum of two Gaussian distributions as $$C_{p_b}(x_a) \approx C_{p_b}^+(x_a) + C_{p_b}^-(x_a), \qquad (62)$$

with $$C^{\pm}_{p_b}(x_a) = \left(\frac{2}{\pi}\right)^{\frac{1}{4}} e^{-\frac{\left(x_a \mp \frac{\xi}{2}\right)^2}{4w^2}}.$$

The separation and the width of the Gaussian peaks are $$\xi = 2\sqrt{\frac{p_b}{\tau}} \text{ and } w = (2\tau\xi)^{-1},$$

respectively. Intuitively, Eq. (62) implies the measurement outcome of $p_b$ infers $$|\hat{x}_a| = \frac{\xi}{2}$$

up to the uncertainty or w, which projects the FH mode to a coherent superposition of displaced squeezed states.

In the following, we analyze the squared quadrature QND measurement for the generation of squeezed Schödinger's cat state. As the initial FH state, we consider a p-squeezed vacuum state with width $$w_a = \sqrt{\langle \hat{x}_a^2 \rangle - \langle \hat{x}_a \rangle^2}$$

along the x-quadrature. Conditioned on the measurement outcome of $p_b>0$, the post-measurement FH state approximately becomes $$|\varphi_a'\rangle \propto \int dx_a \left(C^{+}_{p_b}(x_a) + C^{-}_{p_b}(x_a)\right)|x_a\rangle, \tag{63}$$

where we have assumed $$w_a^2 \gg \xi w$$

(see Appendix B of the Oph article for full discussions). Notice that (63) is a coherent superposition of two x-squeezed states, each with width w separated by distance $\xi$, which is a squeezed cat state. In FIG. 9, we show the results of the full-quantum simulation, where the initial FH squeezed vacuum is projected onto non-Gaussian states depending on the SH homodyne measurement outcome $p_b$. In the region where $p_b$ is large, the post-measurement FH state becomes a highly non-classical squeezed cat state.

The ability to realize cubic QND Hamiltonian can have implications for more generic non-Gaussian quantum state engineering. To highlight this point, we introduce the deterministic generation of a cubic phase state. An overview of this system 600 is shown in FIG. 6. As an initial state, we consider an EPR-state (referring to Einstein, Podolsky, and Rosen) with correlation $\hat{x}_a(0)-\hat{x}_b(0)\approx 0$ and $\hat{p}_a(0)+\hat{p}_b(0)\approx 0$. By Eq. (59), we can solve for the dynamics of the FH quadrature operator as $$\hat{p}_a(\tau) = \tau(2\hat{x}_a(0)\underbrace{\hat{x}_b(0)}_{\approx 3\tau\hat{x}_a^2(\tau)} + \hat{x}_a^2(0)) + \hat{p}_a(0) \underbrace{\pm}_{\approx 0} \hat{p}_b(0) - \underbrace{\hat{p}_b(\tau)}_{\mapsto p_b}, \tag{64}$$

where the first term and the second term approximately become $$3\tau\hat{x}_a^2(0) \approx 3\tau\hat{x}_a^2(\tau)$$

and 0, respectively. After propagating through the $\chi^{(2)}$ nonlinear medium 682, we perform p-quadrature measurement on the SH mode, which collapses the third term to a real number $p_b$. As a result, applying an FH p-displacement operation to compensate for this change, we can deterministically enforce $$\hat{p}_a(\tau) = 3\tau\hat{x}_a^2(\tau),$$

which indicates that the final FH state becomes a cubic phase state 675.

Figure 10:
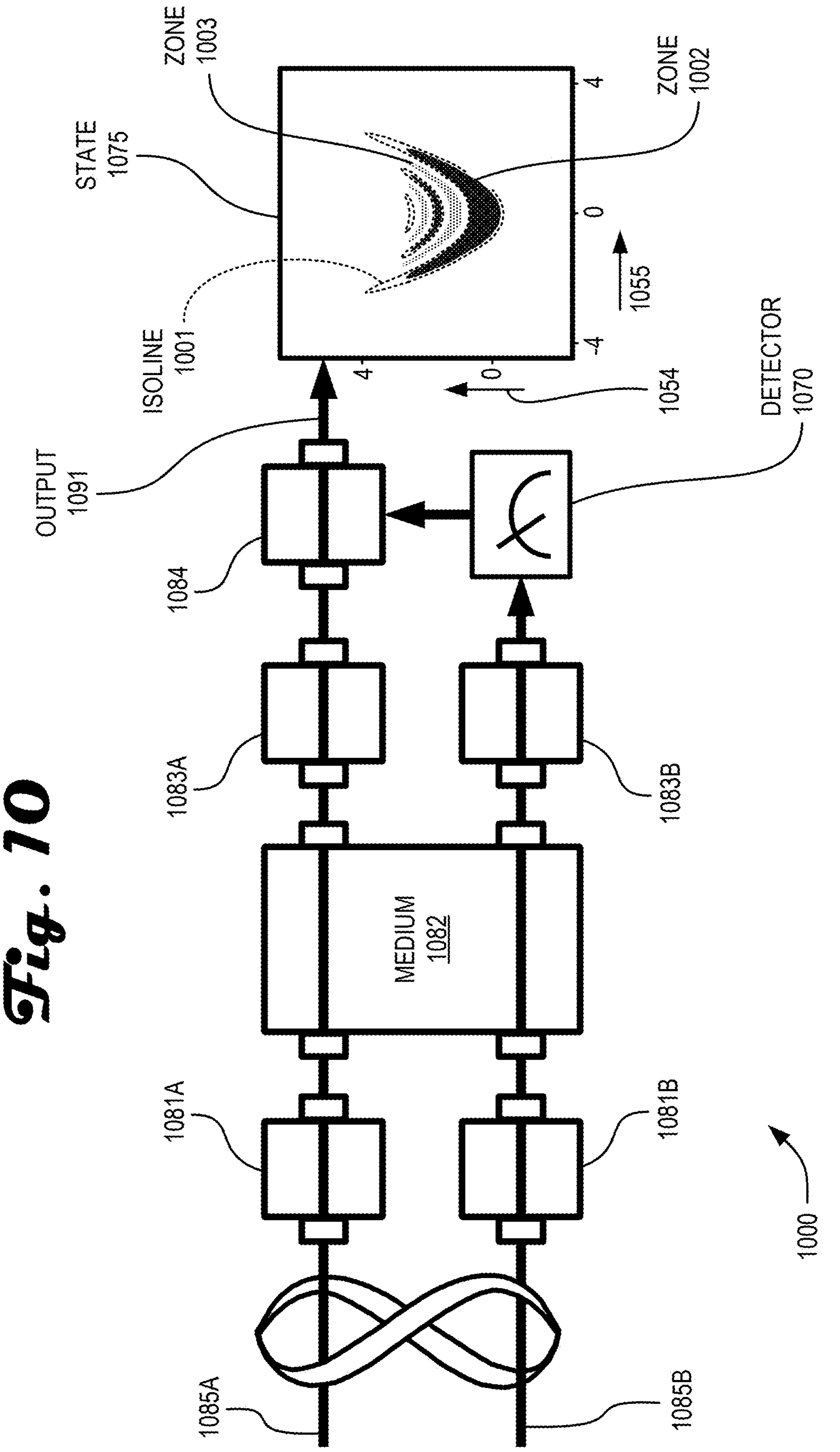
FIG. 10 depicts a deterministic cubic-phase state generation system featuring at least one OPA summarizing results of numerical simulations in which one or more improved technologies may be incorporated.

Referring now to FIG. 10, there is shown a deterministic cubic-phase state generation system 1000 using optical parametric interactions (via a medium 1082 configured as an OPA 160. We show the phase-space portrait (Wigner function) of the state generated using an initial EPR-pair with 10 dB of squeezing and τ=0.2, which resulted in nonlinear quadrature squeezing $$\Delta^2_{NL} = 0.255.$$

Figure 11:
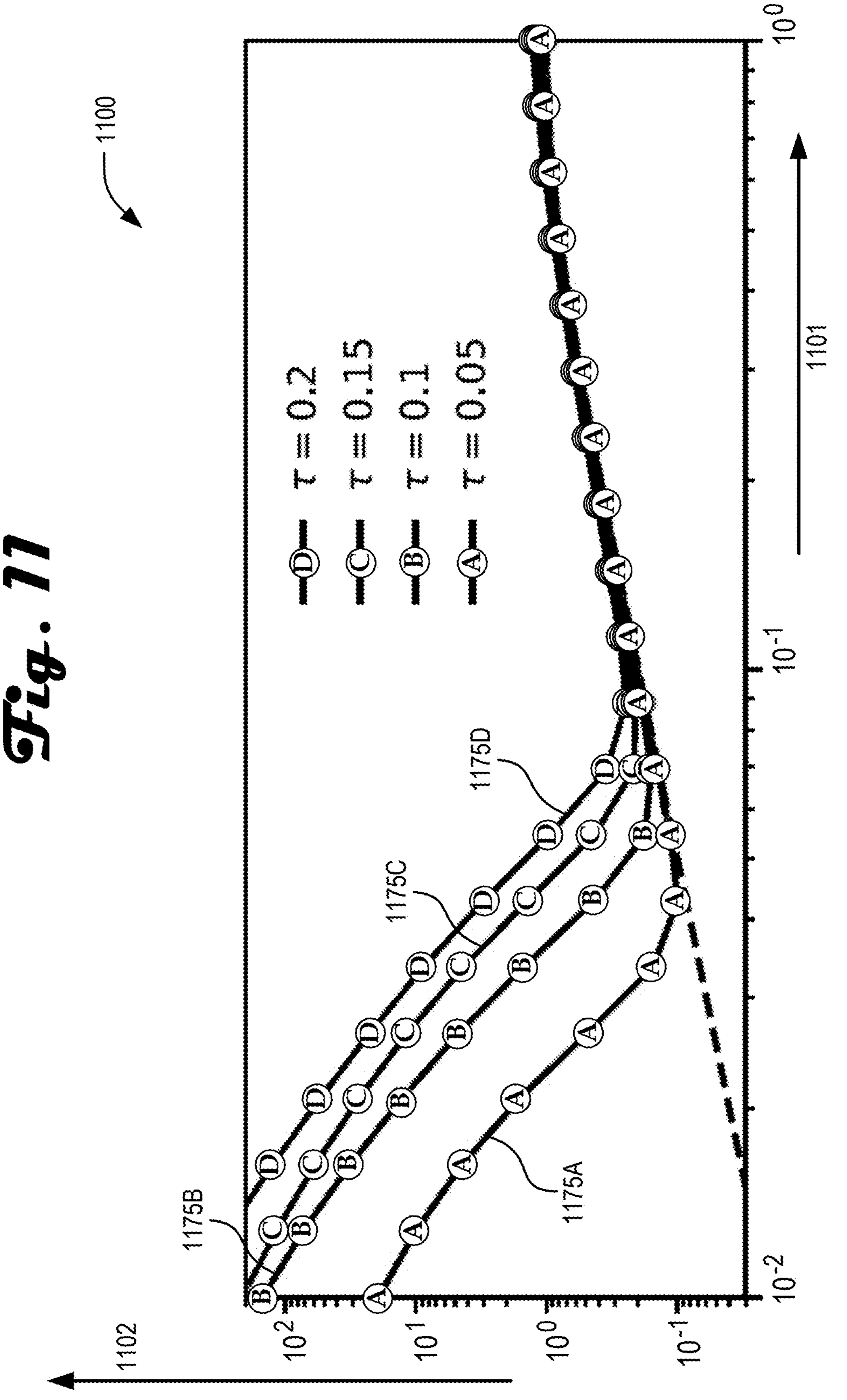
FIG. 11 depicts plots of nonlinear squeezing as a function of an initial EPR squeezing for various values of $\tau$ in which one or more improved technologies may be incorporated.

Referring now to FIG. 11, there is shown a log-log plot 1100 of a nonlinear (NL) squeezing $$\Delta^2_{NL}$$

axis 1102 as a function of an initial EPR squeezing $$\Delta^2_{EPR}$$

axis 1101 for various values of t in the context of system 1000 of FIG. 10. The black dashed line represent $$\Delta^2_{EPR} = \Delta^2_{NL}.$$

For FIGS. 9-11 we use $$r_a^2 = r_b^2 = 10.$$

Realistically, the EPR state can only have a finite squeezing, leading to finite variances $$\mathrm{Var}(\hat{x}_a(0) - \hat{x}_b(0)) = \mathrm{Var}(\hat{p}_a(0) + \hat{p}_b(0)) = \frac{\Delta^2_{EPR}}{4},$$

which degrades the quality of the resultant cubic phase state. To quantify the quality of the approximate cubic phase state, we consider the nonlinear squeezing characterized by $$\mathrm{Var}(\hat{p}_{NL}) = \Delta_{NL}^2/4,$$

which is the variance of a nonlinear quadrature $$\hat{p}_{NL} = \hat{p}_a - 3\tau\hat{x}_a^2.$$

Plot 1100 shows a trade-off among $\Delta_{NL}$, $\Delta_{EPR}$, and $\tau$, where we can find an optimal $\Delta_{EPR}$ that minimizes $\Delta_{NL}$ for a given $\tau$.

In FIG. 10, we show the phase-space portrait of the cubic phase state generated with a corresponding system 1000, also summarizing results of our numerical simulations. System 1000 can, in some variants, include or resemble system 100 or system 200 (or both). Respective media 1081A-B and at least one phase-matched optical parametric amplifier 160 (e.g. comprising medium 1082) receive a fundamental harmonic 1085A and a second harmonic 1085B. Downstream from additional media 1083A-B, 1084 as shown is a detector 1070 conditioning system output 1091 corresponding to an output state 1075 (featuring isolines 1001 and zones 1002-1003 as described above) represented as a $p_a$ axis 1054 against a corresponding $x_a$ axis 1055 for various outcomes to support an inference as further described below.

Generally, for quantum state engineering using measurement-based post-selection, the purity of the resultant state is critically limited by the overall quantum efficiency (QE) of the measurement. In addition to the inefficiency of the detector itself, any photon loss in the setup, e.g., outcoupling loss for nanophotonic implementations, can degrade the overall QE. The issue is particularly severe for photon-number-resolving (PNR) measurements, where a low QE directly impacts the purity of the produced state. On the other hand, it is possible to mitigate the imperfect QE for quadrature measurements, e.g., homodyne measurements, by pre-amplifying the signal using optical parametric amplifiers. Our QND measurement scheme described above already involves such pre-amplification as the second-stage SH squeezing operation $$\hat{S}_b^{\dagger}.$$

See FIG. 3 of the Oph article for an illustration of a phase-space representation of the squeezed cat states heralded by a homodyne detector with finite QE n. As can be seen from that figure, the cat-state generation scheme described herein can tolerate a reasonably large imperfection of the detector, e.g., $\eta$=80%. By applying additional pre-amplification with gain G, we can generate high-purity cat states even under a larger detector inefficiency, e.g., $\eta$=20% with G=10. Such high robustness to low quantum efficiency is particularly attractive to counteract a large, fixed loss in the detector setup, which is prevailing, e.g., as the outcoupling loss in off-chip detection from a nanophotonic waveguide. We note pre-amplifiers with stronger gain generally accompany larger loss, which realistically limits the maximum gain G one could employ.

Wigner functions of the heralded squeezed cat states using the cubic QND measurement and homodyne detectors with various QE $\eta$. The generation of a cat state with size $\xi$=4 is heralded by the SH homodyne outcome $$p_b = \sqrt{G\eta}\,\frac{\tau\xi^2}{4},$$

where $\tau$=1.0 is the normalized interaction time, and G is the power gain of the pre-amplifier placed before the detector. At the bottom of each plot, we show the purity of the resultant state (abbreviated as Pur.). The effect of the loss is simulated using the Monte-Carlo wavefunction (MCWF) method with $10^4$ trajectories.

Another primary source of decoherence is propagation loss inside the nonlinear medium. Nominally, a characteristic nonlinear coupling rate g is desired to be greater than the characteristic photon loss rate $\kappa$ to observe non-Gaussian quantum features 195, leading to a design feature for strong coupling $$\frac{g}{\kappa} > 1.$$

In our scheme, strong squeezing of the fields leads to a mesoscopic number of photons involved in the dynamics, enhancing effective nonlinear dynamical rate. This allows us to generate highly non-classical states with a native nonlinear coupling rate at least an order smaller than strong coupling. To see this more concretely, we assume the same squeezing gain and decoherence rate for FH and SH, i.e., $r=r_a=r_b$ and $\kappa=\kappa_a=\kappa_b$. As Eq. (57) implies, external squeezing operations increase the effective nonlinear coupling rate by a factor scaling cubically to field gain $g_{eff}=r^3$ g. At the same time, the photon loss rate increases proportionally to the number of photons, leading to an effective decoherence rate of $\kappa_{eff}=r^2\kappa$. As a result, the overall figure of merit $$\frac{g_{eff}}{\kappa_{eff}} = \frac{rg}{\kappa}$$

is improved by a factor proportional to the field gain of the squeezers, providing tolerance against photon loss. Suitable examples of enhancement of nonlinear coupling with amplified quantum fluctuations has been presented recently in R. Yanagimoto, T. Onodera, E. Ng, L. G. Wright, P. L. McMahon, and H. Mabuchi, Engineering a Kerr-Based Deterministic Cubic Phase Gate via Gaussian Operations, Phys. Rev. Lett. 124, 240503 (2020); in C. Leroux, L. C. G. Govia, and A. A. Clerk, Enhancing Cavity Quantum Electrodynamics via Antisqueezing: Synthetic Ultrastrong Coupling, Phys. Rev. Lett. 120, 093602 (2018); in W. Qin, A. Miranowicz, P.-B. Li, X.-Y. Lü, J. Q. You, and F. Nori, Exponentially Enhanced Light-Matter Interaction, Cooperativities, and Steady-State Entanglement Using Parametric Amplication, Phys. Rev. Lett. 120, 093601 (2018); and in Y. Michael, L. Bello, M. Rosenbluh, and A. Pe'er, Squeezing-enhanced raman spectroscopy, npj Quantum Inf. 5, 1 (2019).

To verify the enhancement of nonlinearity, we show (in FIG. 4 of the Oph article) the volume of Wigner function negativity of the heralded cat state for various squeezing parameters and $$\frac{g}{\kappa}.$$

As can be seen from that figure, strong squeezing operations enable us to improve the quality of the generated cat states for given values of $$\frac{g}{\kappa}.$$

The inset shows the Wigner function of the state attainable with $$\frac{g}{\kappa} \approx 0.15$$

and 20 dB of squeezing (i.e., r=10), showing that the design feature for $$\frac{g}{\kappa}$$

to produce a visible amount of Wigner function negativity is alleviated by an order of magnitude.

FIG. 4 of the Oph article shows a volume of the Wigner function negativity of cat states generated by the cubic QND measurement with various squeezing and loss. The homodyne conditioning there is performed to herald the generation of a cat state with size $\xi=3.5$ at $\tau=0.55$, which approximately maximizes the non-classicality of the state over the parameter space studied here. The inset shows the Wigner function of the generated state with 20 dB of squeezing and $$\frac{g}{\kappa} \approx 0.15.$$

See Appendix C of the Oph article for full discussions.

Experimentally, recent progress in $\chi^{(2)}$ nonlinear nanophotonics has made significant progress toward the strong coupling regime. Using high-Q micro-ring resonators, $$\frac{g}{\kappa} \sim 0.01$$

has been achieved on thin-film lithium niobate (TFLN) nanophotonics and indium gallium phosphide nanophotonics. With further advances in the fabrication techniques that enable material-absorption-limited loss, $$\frac{g}{\kappa} \sim 1$$

could be envisaged. Beyond the conventional continuous-wave devices, $$\frac{g}{\kappa} \sim 10$$

might be possible by leveraging the three-dimensional confinement of optical fields using ultrashort pulses. These numbers suggest that the experimental realization of our scheme might be within reach in next-generation $\chi^{(2)}$ nanophotonics.

We have proposed and analyzed a scheme to engineer cubic QND Hamiltonian using squeezing operations and optical parametric interactions. Such cubic QND can not only directly enable deterministic CVQC but also serves as a versatile tool for efficient non-Gaussian quantum state engineering, e.g., for cat states and cubic phase states. The produced resource states constitute essential building blocks for contemporary quantum engineering, e.g., for generating GKP states and four-component cat states. Compared to the existing quantum engineering protocols using cubic nonlinear optics, our approach employs quadratic nonlinear interactions with stronger native coupling rates, potentially offering a more experimentally viable route. Our work unravels unique functionalities that nonlinear optics can realize in the mesoscopic regime. We expect our work to contribute to the rapidly developing quantum engineering toolbox of nonlinear photonics, which we believe will allow us to leverage rapid advances in experiments maximally.

Although various operational flows are each described in sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While various system, method, article of manufacture, or other embodiments or aspects have been disclosed above, also, other combinations of embodiments or aspects will be apparent to those skilled in the art in view of the above disclosure. The various embodiments and aspects disclosed above are for purposes of illustration and are not intended to be limiting, with the true scope and spirit being indicated in the final claim set that follows.

In the numbered clauses below, first combinations of aspects and embodiments are articulated in a shorthand form such that (1) according to respective embodiments, for each instance in which a "component" or other such identifiers appear to be introduced (e.g., with "a" or "an,") more than once in a given chain of clauses, such designations may either identify the same entity or distinct entities; and (2) what might be called "dependent" clauses below may or may not incorporate, in respective embodiments, the features of "independent" clauses to which they refer or other features described above.

CLAUSES

Clause 1. A quantum detection method (e.g. using one or more systems 100, 200) comprising:

configuring (at least) a first quadratic coupling strength 183 within one or more optical media 282 that implement one or more optical parametric amplifiers (OPAs) 160;

obtaining a first pump state 137 or other input state 111A-B including one or more photonic components 176;

establishing a first nonlinearity enhancement coupling 272 so that the first quadratic coupling strength 183 in the one or more OPAs 160 is enhanced with (at least) an additional quadratic coupling strength 253;

transmitting a first output 191-192, 291 that includes (at least) a first photonic component 176 of the first input state (e.g. via a first output port 208C or 208D); and transmitting via the first nonlinearity enhancement coupling 272 a first extraction result 292 (e.g. a digital measurement 178) that encodes the first photonic component 176 of the first input state (e.g. via a second output port 208D or 208C) without demolishing the first photonic component 176 of the first output 191-192, 291.

Clause 2. The quantum detection method of any of the above method clauses comprising:

triggering an ultra-fast universal quantum computation with the first nonlinearity enhancement coupling 272 implementing one or more Gottesman-Kitaev-Preskill (GKP) states in a computing system 100, 200 having a continuous-variable portion of a computing system 100, 200.

Clause 3. The quantum detection method of any of the above method clauses comprising:

triggering a room-temperature universal quantum computation with one or more GKP states in the first nonlinearity enhancement coupling 272 in a continuous-variable portion of a computing system 100, 200.

Clause 4. The quantum detection method of any of the above method clauses comprising:

implementing a room-temperature quantum computation with one or more GKP states via the first nonlinearity enhancement coupling 272 in a continuous-variable portion of a computing system 100, 200.

Clause 5. The quantum detection method of any of the above method clauses comprising:

obtaining a first Gaussian quadrature measurement 178; and implementing a general-dyne measurement 178 after purifying the first Gaussian quadrature measurement 178 so as to generate one or more purified GKP states (e.g. as an output feature 195) via the first nonlinearity enhancement coupling 272.

Clause 6. The quantum detection method of any of the above method clauses comprising:

creating a generated cat state in the first nonlinearity enhancement coupling 272 having a cat state size of 3.5±0.1 and a squeezing time of 0.55±0.5 so as to achieve a suitable nonclassicality of the generated cat state.

Clause 7. The quantum detection method of any of the above method clauses comprising:

(at least temporarily) implementing a generated cat state in the first nonlinearity enhancement coupling 272 having a cat state size of 3.5±1.0 and a squeezing time of 0.55±1.0 so as to achieve a suitable nonclassicality of the generated cat state (e.g. for orders of magnitude of squeezer gain or loss as indicated in FIG. 5 of the Oph article).

Clause 8. The quantum detection method of any of the above method clauses comprising:

manifesting a generated cat state in the first nonlinearity enhancement coupling 272 having a cat state size of 3.5±0.2 and a squeezing time of 0.55±2.0 so as to achieve a sufficient nonclassicality of the generated cat state (e.g. suitable for a wide range of squeezer gain and loss parameters).

Clause 9. The quantum detection method of any of the above method clauses wherein the first nonlinearity enhancement coupling 272 is (at least temporarily) configured as a first ponderomotive ($\hat{N}_a \times \hat{x}_b$) coupling 272.

Clause 10. The quantum detection method of any of the above method clauses comprising:

configuring a specific photonic component 176 of the one or more photonic components as a signal quadrature squared 161 and the one or more OPAs 160 to include a specific phase-matched OPA 160 that receives the signal quadrature squared 161.

Clause 11. The quantum detection method of any of the above method clauses comprising:

configuring a specific photonic component 176 of the one or more photonic components as a signal quadrature squared 161 and the one or more OPAs 160 to include a specific phase-matched OPA 160 that receives the signal quadrature squared 161 so that the specific phase-matched OPA 160 has a first quadratic coupling strength that is enhanced with an additional quadratic coupling strength 253 that is 2 to 20 times larger than the first quadratic coupling strength.

Clause 12. The quantum detection method of any of the above method clauses comprising:

configuring a given photonic component 176 of the one or more photonic components as a pump modular quadrature 162 and the one or more OPAs 160 to include a given phase-mismatched OPA 160 that receives the pump modular quadrature 162.

Clause 13. The quantum detection method of any of the above method clauses comprising:

configuring a given photonic component 176 of the one or more photonic components as a pump modular quadrature 162 and the one or more OPAs 160 to include a given phase-mismatched OPA 160 that receives the pump modular quadrature 162 so that the given phase-mismatched OPA 160 has a native quadratic coupling strength 183 that is enhanced with an additional quadratic coupling strength 253 that is more than 50% larger and less than to 50 times larger than the native quadratic coupling strength 183.

Clause 14. The quantum detection method of any of the above method clauses comprising:

configuring a particular photonic component 176 of the one or more photonic components as a number of signal Bogoliubov excitations 163 and the one or more OPAs 160 to include a particular phase-mismatched OPA 160 that receives the pump modular quadrature 162.

Clause 15. The quantum detection method of any of the above method clauses comprising:

configuring a particular photonic component 176 of the one or more photonic components as a number of signal Bogoliubov excitations 163 and the one or more OPAs 160 to include a particular phase-mismatched OPA 160 that receives the pump modular quadrature 162 so that the particular phase-mismatched OPA 160 has a native quadratic coupling strength 183 that is enhanced with an additional quadratic coupling strength 253 that is 2 to 20 times larger than the native quadratic coupling strength 183.

Clause 16. The quantum detection method of any of the above method clauses comprising:

configuring a first OPA 160 of the one or more OPAs 160 as a phase-mismatched OPA 160 configured to establish a first ponderomotive $(\tilde{N}_a \times \hat{x}_b)$ coupling 272 in the first OPA 160.

Clause 17. The quantum detection method of any of the above method clauses comprising:

configuring a particular OPA 160 of the one or more OPAs 160 (at least temporarily) as a phase-matched OPA 160 configured to establish a squeezed cat state therein.

Clause 18. The quantum detection method of any of the above method clauses comprising:

establishing a first ponderomotive $(\tilde{N}_a \times \hat{x}_b)$ coupling 272 as the first nonlinearity enhancement coupling 272 so that the first quadratic coupling strength 183 in the one or more OPAs 160 is enhanced with (at least) an additional quadratic coupling strength 253 resulting from the first ponderomotive $(\tilde{N}_a \times \hat{x}_b)$ coupling 272.

Clause 19. The quantum detection method of any of the above method clauses comprising:

configuring a quadratic nonlinear resonator as the first nonlinearity enhancement coupling 272; and pumping the first nonlinearity enhancement coupling 272 with an external drive field 131 with a finite decoherence rate 177 (κ) that devolves a quantum superposition of transient signal cat states in a squeezed Fock state ladder so that the first nonlinearity enhancement coupling 272 becomes an optical parametric oscillator (OPO) whereby signal photon loss induces quantum jumps among the signal states in the transient signal cat states.

Clause 20. The quantum detection method of any of the above method clauses comprising:

transmitting the first output that includes (at least) a primary feature 195 of the first input state via a first output port 208D; and transmitting via a first ponderomotive $(\hat{N}_a \times x_b)$ coupling 272 as at least an element of the first nonlinearity enhancement coupling 272 a first extraction result 292 (e.g. a digital measurement 178 or other encoding 278) that encodes one or more elements the first photonic component 176 (e.g. state-indicative modes 166) including a number 264 of signal Bogoliubov excitations 163 of the first input state via a second output port 208C without demolishing the first output.

Clause 21. The quantum detection method of any of the above method clauses whereby phase-noise induced by self-phase modulation is sufficiently mitigated so that the first extraction result 292 is obtained without demolishing the first photonic component 176.

Clause 22. The quantum detection method of any of the above method clauses whereby one or more non-Gaussian quantum states inside a Hamiltonian medium 282 are generated and used to allow the first extraction result 292 to be obtained without demolishing the first photonic component 176.

Clause 23. The quantum detection method of any of the above method clauses whereby one or more non-Gaussian quantum states inside (an optical cavity of) a Hamiltonian medium 282 are generated and used to allow the first extraction result 292 to be obtained without demolishing the first photonic component 176.

Clause 24. The quantum detection method of any of the above method clauses comprising:

implementing a Hamiltonian medium 282 as (a component of) an optical parametric oscillator (OPO) in which the extraction result 292 comprises an out-coupled pump field 131 monitored by a homodyne detector 170 so that an intra-cavity squeezed photon-number state can be inferred without demolishing the first photonic component 176.

Clause 25. The quantum detection method of any of the above method clauses comprising:

inducing one or more displacements 261 on the pump mode 136 conditioned on a number $(\hat{N}_a)$ of signal Bogoliubov excitations 163 of the first input state whereby a quantum nondemolition measurement 178 of the signal Bogoliubov excitations 163 is obtained indirectly via a homodyne detector 170.

Clause 26. The quantum detection method of any of the above method clauses whereby a mesoscopic number of photons inside (an optical cavity of) a Hamiltonian medium 282 effectively allow a native nonlinear coupling rate with $$0.1 < \frac{g}{\kappa} < 1$$

and thereby allow the first extraction result 292 to be obtained without demolishing first photonic component 176.

Clause 27. The quantum detection method of any of the above method clauses whereby phase-noise induced by self-phase modulation is sufficiently mitigated so that the first extraction result 292 is obtained without demolishing first photonic component 176.

Clause 28. The quantum detection method of any of the above method clauses wherein a photon-number-resolving (PNR) quantum nondemolition (QND) measurement 178 is obtained with a homodyne detector 170 between 15° C. and 30° C. (e.g. at room temperature).

Clause 29. The quantum detection method of any of the above method clauses whereby a photon-number-resolving (PNR) quantum nondemolition (QND) measurement 178 is obtained in less than 10 microseconds via a Hamiltonian medium 282 between 15° and 30° C. (e.g. at room temperature).

Clause 30. The quantum detection method of any of the above method clauses whereby a photon-number-resolving (PNR) quantum nondemolition (QND) measurement 178 is obtained in less than 100 nanoseconds (e.g. as an "ultrafast" measurement 178) via a homodyne detector 170 between 0° C. and 55° C.

Clause 31. The quantum detection method of any of the above method clauses whereby a photon-number-resolving (PNR) quantum nondemolition (QND) measurement 178 is obtained in less than 100 nanoseconds (e.g. as an "ultrafast" measurement 178) via a homodyne detector 170 between 15° and 30° C. (e.g. at room temperature).

Clause 32. The quantum detection method of any of the above method clauses wherein a first ponderomotive $(N_a \times \hat{x}_b)$ coupling 272 as the first nonlinearity enhancement coupling 272 is at least temporarily established among the first input state and one or more pump field quadratures $(\hat{x}_b)$ 134.

Clause 33. The quantum detection method of any of the above method clauses wherein a first ponderomotive $(\hat{N}_a \times \hat{x}_b)$ coupling 272 as the first nonlinearity enhancement coupling 272 is established among a number $(\hat{N}_a)$ 264 of signal Bogoliubov excitations 163 of the first input state and one or more pump field quadratures $(\hat{x}_b)$ 134.

Clause 34. The quantum detection method of any of the above method clauses comprising:

a first preparatory operation of configuring an encoding unit 140 to include at least one phase-mismatched OPA 160B in the one or more OPAs 160 that receives a number ($\hat{N}_a$) 264 of signal Bogoliubov excitations 163; and a second preparatory operation of configuring the encoding unit 140 in a universal photonic quantum information processing (QIP) system 100, 200.

Clause 35. The quantum detection method of any of the above method clauses comprising:

establishing a first ponderomotive ($\hat{N}_a \times \hat{x}_b$) coupling 272 as the first nonlinearity enhancement coupling 272 so that $$0.1 < \frac{g}{\kappa} < 10000.$$

Clause 36. The quantum detection method of any of the above method clauses comprising:

establishing a first ponderomotive ($\hat{N}_a \times \hat{x}_b$) coupling 272 (at least temporarily) as the first nonlinearity enhancement coupling 272 so that $$0.3 < \frac{g}{\kappa} < 3000,$$

wherein g is a nonlinear coupling constant 176 and K is a decoherence rate 177 (κ) of the first ponderomotive coupling 272.

Clause 37. The quantum detection method of any of the above method clauses comprising:

establishing a first ponderomotive ($\hat{N}_a \times \hat{x}_b$) coupling 272 as the first nonlinearity enhancement coupling 272 so that $$0.1 < \frac{g}{\kappa} < 1,$$

wherein g is a nonlinear coupling constant 176 thereof and κ is a decoherence rate 177 (κ) thereof.

Clause 38. The quantum detection method of any of the above method clauses comprising:

establishing a first ponderomotive ($\hat{N}_a \times \hat{x}_b$) coupling 272 as the first nonlinearity enhancement coupling 272 so that $$\frac{g}{\kappa} > 0.2.$$

Clause 39. The quantum detection method of any of the above method clauses comprising:

establishing a first ponderomotive ($\hat{N}_a \times \hat{x}_b$) coupling 272 as the first nonlinearity enhancement coupling 272 so that $$\frac{g}{\kappa} > 0.5,$$

wherein g is a nonlinear coupling constant 176 thereof and κ is a decoherence rate 177 (κ) thereof.

Clause 40. The quantum detection method of any of the above method clauses comprising:

transmitting a measurement 178 or other encoding 278 of the first photonic component 176 of the first input state without diminishing the first photonic component 176.

Clause 41. The quantum detection method of any of the above method clauses wherein the additional quadratic coupling strength 253 is more than 50% larger than the first quadratic coupling strength 183 and less than 50 times larger than the first quadratic coupling strength 183.

Clause 42. The quantum detection method of any of the above method clauses wherein the additional quadratic coupling strength 253 is 2 to 20 times larger than the first quadratic coupling strength 183.

Clause 43. The quantum detection method of any of the above method clauses wherein the additional quadratic coupling strength 253 is 4 to 40 times larger than the first quadratic coupling strength 183.

Clause 44. The quantum detection method of any of the above method clauses comprising:

transmitting a first pump output 192 that encodes a number ($\hat{N}_a$) 264 of the signal Bogoliubov excitations 163 of the first input state without demolishing a mode 166 or other photonic component 176 of the first output 191.

Clause 45. The quantum detection method of any of the above method clauses wherein the one or more photonic components 176 include a signal quadrature squared 161 or a pump modular quadrature 162 or a number of signal Bogoliubov excitations 163.

Clause 46. The quantum detection method of any of the above method clauses comprising:

configuring one of the one or more photonic components 176 to contain a signal quadrature squared 161 or a pump modular quadrature 162 (or both).

Clause 47. The quantum detection method of any of the above method clauses comprising:

configuring one of the one or more photonic components 176 to contain a signal quadrature squared 161 or a number of signal Bogoliubov excitations 163.

Clause 48. The quantum detection method of any of the above method clauses comprising:

configuring one of the one or more photonic components 176 to contain a pump modular quadrature 162 or a number of signal Bogoliubov excitations 163 (or both).

Clause 49. The quantum detection method of any of the above method clauses comprising:

configuring a specific photonic component 176 of the one or more photonic components 176 to contain a signal quadrature squared 161.

Clause 50. The quantum detection method of any of the above method clauses comprising:

configuring a given photonic component 176 of the one or more photonic components 176 to contain a pump modular quadrature 162.

Clause 51. The quantum detection method of any of the above method clauses comprising:

configuring a particular photonic component 176 of the one or more photonic components 176 to contain a number ($\hat{N}_a$) 264 of signal Bogoliubov excitations 163.

Clause 52. The quantum detection method of any of the above method clauses comprising:

transmitting a pump output 192 as a component of a first extraction result 292 that encodes (at least) a number ($\hat{N}_a$) 264 of signal Bogoliubov excitations 163 as a first element 165 of the first input state without demolishing the first output.

Clause 53. The quantum detection method of any of the above method clauses comprising:

transmitting a pump output 192 or other first result 292 that encodes (at least) a number ($\hat{N}_a$) 264 of signal Bogoliubov excitations 163 as a first element 165 of the first input state without demolishing the first output.

Clause 54. The quantum detection method of any of the above method clauses comprising:

obtaining and transmitting a digital measurement 178 of the first photonic component 176 of the first input state in a pump output 192 or other extracted result 292 without diminishing the first output by more than 1%.

Clause 55. The quantum detection method of any of the above method clauses wherein a first ponderomotive ($\hat{N}_a \times \hat{x}_b$) coupling 272 as (at least) the first nonlinearity enhancement coupling 272 is established in a system 200 like that of FIG. 2.

Clause 56. The quantum detection method of any of the above method clauses wherein a first ponderomotive ($\hat{N}_a \times \hat{x}_b$) coupling 272 as the first nonlinearity enhancement coupling 272 is established in a system 100 like that of FIG. 1.

Clause 57. A system 100, 200 configured to perform the method of any one of the above method clauses.

Clause 58. A system 100, 200 made by the method of any one of the above method clauses.

With respect to the numbered claims expressed below, those skilled in the art will appreciate that recited operations therein may generally be performed in any order. Also, although various operational flows are presented in sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Terms like "responsive to," "related to," or other such transitive, relational, or other connections do not generally exclude such variants, unless context dictates otherwise. Furthermore each claim below is intended to be given its least-restrictive interpretation that is reasonable to one skilled in the art.

The claims that follow are fully supported by the above description independently of any document referred to in this description. Even greater concision and clarity may result, however, from using media that include color, shading, searchable text, and hyperlinked access to related content. It is accordingly recommended that color-enhanced online versions of publications cited herein are consulted, where feasible, to enjoy a faster mastery of technologies that support the content herein.

What is claimed is:

1. A quantum detection method comprising:

configuring a first quadratic coupling strength within one or more optical media that implement one or more optical parametric amplifiers (OPAs);

obtaining a first input state including one or more photonic components;

establishing a first nonlinearity enhancement coupling so that said first quadratic coupling strength in said one or more OPAs is enhanced with an additional quadratic coupling strength that is larger than said first quadratic coupling strength;

transmitting a first output that includes a first photonic component of said one or more photonic components via a first output port; and transmitting via said first nonlinearity enhancement coupling a first extraction result that encodes said first photonic component of said first input state via a second output port without demolishing said first photonic component of said first output.

2. The quantum detection method of claim 1 comprising:

obtaining and transmitting via said first nonlinearity enhancement coupling said first extraction result that encodes said first photonic component of said first input state via a second output port without diminishing said first photonic component by more than 1%.

3. The quantum detection method of claim 1 comprising:

triggering an ultra-fast universal room-temperature quantum computation with said first nonlinearity enhancement coupling implementing one or more Gottesman-Kitaev-Preskill (GKP) states in a computing system.

4. The quantum detection method of claim 1 comprising:

configuring said first photonic component as a signal quadrature squared and said one or more OPAs to include a specific phase-matched OPA that receives said signal quadrature squared so that said specific phase-matched OPA has a first quadratic coupling strength that is enhanced with an additional quadratic coupling strength that is larger than said first quadratic coupling strength by less than 20 times.

5. The quantum detection method of claim 1 comprising:

configuring said first photonic component as a pump modular quadrature and said one or more OPAs to include a given phase-mismatched OPA that receives said pump modular quadrature so that said given phase-mismatched OPA has a native quadratic coupling strength that is enhanced with an additional quadratic coupling strength that is larger than said native quadratic coupling strength by less than 50 times.

6. The quantum detection method of claim 1 comprising:

configuring said first photonic component as a number of signal Bogoliubov excitations and said one or more OPAs to include a particular phase-mismatched OPA that receives said pump modular quadrature so that said particular phase-mismatched OPA has a native quadratic coupling strength that is enhanced with an additional quadratic coupling strength that is larger than said native quadratic coupling strength by less than 20 times.

7. The quantum detection method of claim 1 wherein said additional quadratic coupling strength is more than 50% larger than said first quadratic coupling strength and less than 50 times larger than said first quadratic coupling strength.

8. The quantum detection method of claim 1 comprising:

configuring a first OPA of said one or more OPAs as a phase-mismatched OPA configured to establish a first ponderomotive (N¨_a×x^_b) coupling in said first OPA.

9. The quantum detection method of claim 1 comprising:

configuring a particular OPA of said one or more OPAs (at least temporarily) as a phase-matched OPA configured to establish a squeezed cat state therein.

10. The quantum detection method of claim 1 comprising:

establishing a first ponderomotive (N^_a>x^_b) coupling as said first nonlinearity enhancement coupling so that said first quadratic coupling strength in said one or more OPAs is enhanced with an additional quadratic coupling strength resulting from said first ponderomotive (N^_a×x^_b) coupling.

11. The quantum detection method of claim 1 comprising:

configuring a quadratic nonlinear resonator as said first nonlinearity enhancement coupling; and pumping said first nonlinearity enhancement coupling with an external drive field with a finite decoherence rate (κ) that devolves a quantum superposition of transient signal cat states in a squeezed Fock state ladder so that said first nonlinearity enhancement coupling becomes an optical parametric oscillator (OPO) whereby signal photon loss induces quantum jumps among said signal states in said transient signal cat states.

12. The quantum detection method of claim 1 whereby phase-noise induced by self-phase modulation is sufficiently mitigated so that said first extraction result is obtained without demolishing said first photonic component at said first output.

13. The quantum detection method of claim 1 comprising: configuring a Hamiltonian medium as an optical parametric oscillator (OPO) in which said extraction result comprises an outcoupled pump field monitored by a homodyne detector so that an intra-cavity squeezed photon-number state can be inferred without demolishing said first photonic component.

14. The quantum detection method of claim 1 whereby a photon-number-resolving (PNR) quantum nondemolition (QND) measurement is obtained in less than 10 microseconds via a Hamiltonian medium between 0° and 55° C.

15. The quantum detection method of claim 1 comprising: configuring an encoding unit to include at least one phase-mismatched OPA in said one or more OPAs that receives a non-negative number (N^_a) of signal Bogoliubov excitations; and configuring said encoding unit in a universal photonic quantum information processing (QIP) system.

16. The quantum detection method of claim 1 comprising: establishing a first ponderomotive (N^_a×x^_b) coupling as said first nonlinearity enhancement coupling so that $0.1<g/\kappa<10000$, wherein g is a nonlinear coupling constant and κ is a decoherence rate (K) in said first coupling.

17. The quantum detection method of claim 1 comprising: transmitting a pump output or other first result that encodes a non-negative number (N^_a) of signal Bogoliubov excitations as a first element of said first input state without demolishing said first output.

18. The quantum detection method of claim 1 comprising: configuring a primary one of said one or more photonic components as a signal quadrature squared or a pump modular quadrature.

19. A quantum detection system comprising:

means for obtaining a first input state including one or more photonic components;

means for establishing a first nonlinearity enhancement coupling so that said first quadratic coupling strength in said one or more OPAs is enhanced with an additional quadratic coupling strength that is larger than said first quadratic coupling strength;

means for transmitting a first output that includes a first photonic component of said one or more photonic components via a first output port; and means for transmitting via said first nonlinearity enhancement coupling a first extraction result that encodes said first photonic component of said first input state via a second output port without demolishing said first photonic component of said first output.

* * * * *